United States Patent
Ponce de Leon

(10) Patent No.: US 8,751,280 B2
(45) Date of Patent: *Jun. 10, 2014

(54) INTERACTIVE GRAPHICS-BASED PLANNING SYSTEMS

(75) Inventor: Gui Ponce de Leon, Ann Arbor, MI (US)

(73) Assignee: PMA Technologies, LLC, Ann Arbor, MI (US)

(*) Notice: Subject to any disclaimer, the term of this patent is extended or adjusted under 35 U.S.C. 154(b) by 0 days.

This patent is subject to a terminal disclaimer.

(21) Appl. No.: 13/546,609

(22) Filed: Jul. 11, 2012

(65) Prior Publication Data

US 2013/0124249 A1    May 16, 2013

Related U.S. Application Data

(62) Division of application No. 12/029,372, filed on Feb. 11, 2008, now Pat. No. 8,249,906.

(60) Provisional application No. 60/889,496, filed on Feb. 12, 2007, provisional application No. 60/923,459, filed on Apr. 10, 2007.

(51) Int. Cl.
   *G06Q 10/00* (2012.01)
   *G06Q 10/06* (2012.01)

(52) U.S. Cl.
   CPC ...... *G06Q 10/06313* (2013.01); *G06Q 10/0631* (2013.01); *G06Q 10/06* (2013.01); *G06Q 10/0635* (2013.01); *G06Q 10/06375* (2013.01); *Y10S 715/963* (2013.01)
   USPC .......... 705/7.18; 705/28; 705/7.13; 705/7.16; 705/7.17; 705/7.12; 705/7.26; 705/7.27; 705/7.36; 715/700; 715/751; 715/753; 715/963; 717/101; 717/105

(58) Field of Classification Search
   USPC ............................................................. 705/8
   See application file for complete search history.

(56) References Cited

U.S. PATENT DOCUMENTS

| 5,016,170 | A  | 5/1991 | Pollalis et al. |
| 5,101,340 | A  | 3/1992 | Nonaka et al. |
| 5,530,861 | A  | 6/1996 | Diamant et al. |
| 6,256,651 | B1 | 7/2001 | Tuli |
| 6,714,829 | B1 | 3/2004 | Wong |
| 6,732,114 | B1 | 5/2004 | Aamondt et al. |
| 7,113,915 | B1 | 9/2006 | Montemayor et al. |
| 7,644,007 | B2 | 1/2010 | Elazouni |
| 8,249,906 | B2 | 8/2012 | Ponce De Leon |
| 2003/0067491 | A1 | 4/2003 | Cadwallader |
| 2006/0200372 | A1 | 9/2006 | O'Cull et al. |

*Primary Examiner* — James A Reagan
(74) *Attorney, Agent, or Firm* — Carlson, Gaskey & Olds, P.C.

(57) ABSTRACT

This invention relates to providing a system for project planning and scheduling which supports simplified, interactive, graphics-based project planning and scheduling using new planning concepts, new scheduling concepts and new graphics-based software systems. Further, this invention permits an inexperienced user to simultaneously plan and schedule a project including establishing appropriate relationship (or dependency) links between activities, also commonly referred to as tasks, and between activities and milestones. This invention offers the simplest possible scheme of thought that can tie together activities, relationships and milestones, with or without deadlines, to yield a complete, correct network project schedule in the shortest possible time.

38 Claims, 16 Drawing Sheets

Activity Properties

Activity Description: Complete Claims

Start Date (MM/DD/YYYY): 2/28/2007

End Date (MM/DD/YYYY): 7/28/2007

☐ Create detached activity data

Activity Duration (days)

Calendar days: 150

Working Days: 105

☑ Display Activity Description
☑ Display Activity Start/End Dates
☐ Display activity duration
☐ Paint end nodes solid
☑ Display Link Float (days) to success Reset Start/End Dates based on duration
↑ Fix start date & calculate forward
↑ Fix end date & calculate backward
↑ calculate forward
↑ calculate backward OK    Cancel

INTERACTIVE GRAPHICS-BASED PLANNING SYSTEMS

CROSS-REFERENCE TO RELATED APPLICATION

The present application is a division of U.S. Ser. No. 12/029,372 filed Feb. 11, 2008, now U.S. Pat. No. 8,249,906 entitled "INTERACTIVE GRAPHICS-BASED PLANNING SYSTEMS" and is related to and claims priority from prior provisional application Ser. No. 60/889,496, filed Feb. 12, 2007, entitled "INTERACTIVE GRAPHICS-BASED PLANNING SYSTEMS", and claims priority from prior provisional application Ser. No. 60/923,459, filed Apr. 10, 2007, also entitled "INTERACTIVE GRAPHICS-BASED PLANNING SYSTEMS," the contents of both of which are incorporated herein by this reference and are not admitted to be prior art with respect to the present invention by the mention in this cross-reference section.

BACKGROUND

This invention relates to providing a system for project planning and scheduling. More particularly, this invention relates to providing a system for simplified, interactive, graphics-based project planning and scheduling using new planning concepts, new scheduling concepts and new graphics-based software systems. Further, this invention permits an inexperienced user to simultaneously plan and schedule a project including establishing appropriate relationship (or dependency) links between project activities, also commonly referred to as tasks or simply activities, and between activities and milestones.

Typically, projects of any consequence are scheduled by using activity network techniques such as ADM (Arrow Diagramming Method), PDM (Precedence Diagramming Method), or CPM (Critical Path Method). These methods are effective tools when used by highly-trained, experienced, knowledgeable planning professionals, but they are extremely complex and generally cannot be effectively used by inexperienced professionals or laypeople wanting to plan a single project. Even for experienced planning professionals, these tools require that planning and scheduling be bifurcated and undertaken in sequential steps (in "batches"). To create a schedule, the planner must first complete the planning, i.e., define activities and their relationships (also often referred to as relationship links, links or logic ties), without knowing whether the plan, as it evolves, will yield an acceptable schedule. Once the planning is completed the activities must then be scheduled to determine activity dates and resulting "total floats" and yield the anticipated project completion date. Additional steps are often required to optimize the resulting resource demands, optimally crash or extend activities to meet completion requirements or assess schedule risk.

The disconnected, serial, complex protocols typically require much iteration before the plurality of activities and relationships depicting the project are satisfactorily completed. Thus, planning and scheduling become very time-consuming iterative processes; only through laborious trial and error are realistic project schedules achieved. Frequently, the resulting schedules end up presented as a helter-skelter, garbled-up plot only discernible by the scheduler and often ignored by other stakeholders. Finally, for professionals without extensive training in CPM and CPM-based software, not to mention the common person, the concepts and process are too complex and time-consuming to be used even for the simplest projects.

Thus, a great need exists for a system capable of effectively permitting simultaneous interactive project planning and scheduling usable by highly-trained scheduling professionals, project managers with limited CPM and CPM-based software training and even inexperienced users. Additionally, the problems brought about by disconnecting planning from scheduling and the iterative, time-consuming, non-intuitive and resource-intensive process must be solved.

OBJECTS AND FEATURES OF THE INVENTION

A primary object and feature of the present invention is to provide a system for simplifying and improving the efficiency of project planning and scheduling and yielding a network schedule with or without resource/cost optimization.

It is a further object and feature of the present invention to provide such a system to make activity-based project network techniques simple and understandable to laypeople.

It is a further object and feature of the present invention to provide such a system to permit fully interactive, graphically-based planning and scheduling including activity and/or relationship repositioning and fine-tuning and "what-if" analysis of alternate milestone deadlines.

It is a further object and feature of the present invention to provide such a system that permits project activities, their interconnecting relationships as depicted by logic ties (relationship links) and interim and final milestone deadlines to be defined and scheduled simultaneously on a calendar-based timeline.

It is a further object and feature of the present invention to provide such a system to enable time-scaled calendar planning and representation of activities, logic ties and milestones, with and without deadlines, together with immediate feedback on the respective positioning (i.e., dates), durations and floats as bound by the planning information.

It is a further object and feature of the present invention to provide such a system that permits users, not software, to control activity, logic tie (relationship link) definition and milestone positioning on a calendar-based timeline.

It is a further object and feature of the present invention to provide such a system that simplifies and improves the efficiency of the four PDM relationship types through the designation of embedded nodes intermediate of the start and finish nodes of project activities.

It is a further object and feature of the present invention to provide such a system that calculates all project activity related floats the simplest possible way.

It is a further object and feature of the present invention to provide such a system that calculates relationship floats and activity floats, in substantially real time, as activities, relationship (logic) ties and milestone deadlines are changed, repositioned or as new activities, relationship (logic) ties and milestone deadlines are added to the plan.

It is a further object and feature of the present invention, if resources are associated with the activities, to provide such a system that, in substantial and real time, as activities, relationship (logic) ties and milestone deadlines are changed, repositioned or as new activities, relationship (logic) ties and milestone deadlines are added to the plan, calculates and displays the evolving resource profiles so resource-limited activity dates and floats are solidified as the plan evolves.

It is a further object and feature of the present invention that, in substantial and real time, as activities, relationship (logic) ties and milestone deadlines are changed, repositioned or as new activities, relationship (logic) ties and milestone deadlines are added to the plan, if costs are associated with the activities and calendar, to provide such a system that permits activity repositioning and definition so schedule completion is accelerated or extended while optimizing the evolving cost profile.

It is a further object and feature of the present invention that, in substantial and real time, as activities, relationship (logic) ties and milestone deadlines are changed, repositioned or as new activities, relationship (logic) ties and milestone deadlines are added to the plan, if probability distribution functions are associated with the activities, to provide such a system that calculates completion risk profiles and activity criticality indexes the simplest possible way.

It is a further object and feature of the present invention to provide such a system that allows the plan to be progressed and updated the simplest possible way.

A further primary object and feature of the present invention is to provide the simplest possible such system that is efficient, economical, and useful. Other objects and features of this invention will become apparent with reference to the following descriptions.

SUMMARY OF THE INVENTION

In accordance with a preferred embodiment hereof, this invention provides a planning method, relating to at least one project, comprising the steps of: providing at least one computational device having at least one graphical user interface manipulable graphically by at least one project planner; identifying, by such least one project planner, a plurality of activities relating to such at least one project, each activity of such plurality of activities having at least one initial estimated duration; selecting, on such at least one computational device, by such at least one project planner, at least one time-scaled calendar to display on such at least one graphical user interface; positioning, by such at least one project planner using such at least one computational device, of at least one symbol representing each of at least two such activities on such at least one time-scaled calendar on such at least one graphical user interface; selecting, on such at least one computational device, by such at least one project planner, at least one time-dependent relationship between such at least two activities; calculating, by such at least one computational device, at least one relationship float value relating to such at least one time-dependent relationship; and displaying, essentially continuously, by such at least one computational device, such at least one relationship float value on such at least one time-scaled calendar on such at least one graphical user interface. Moreover, it provides such a planning method further comprising the steps of: providing at least one relationship float value ($H_{i,j}$) calculation to calculate such at least one relationship float value wherein such at least one relationship float value ($H_{i,j}$) calculation comprises $H_{i,j}=H_j-H_i$; where "$H_j$" denotes the connection date to at least one successor activity "J" of a plurality of such successor activities and "$H_i$" denotes the connection date from at least one predecessor activity "I" of a plurality of such predecessor activities; and displaying such at least one relationship float value, essentially continuously, by such at least one computational device, on such at least one time-scaled calendar on such at least one graphical user interface.

Additionally, it provides such a planning method, further comprising the steps of: calculating, by such at least one computational device, at least one buffer float value relating to such at least one time-dependent relationship wherein such calculation comprises $BF_i=\min [H_{i,j}]$, for all "J", where "J" denotes each and every successor activity of a plurality of such successor activities to at least one "I" activity and "$H_{i,j}$" denotes such at least one relationship float value relating to each and every such successor activity; and displaying, essentially continuously, by such at least one computational device, such at least one buffer float value on such at least one time-scaled calendar on such at least one graphical user interface. Also, it provides such a planning method, further comprising the steps of: calculating, by such at least one computational device, at least one activity float value relating to such at least one time dependent relationship wherein such calculation comprises $AF_i=\min [H_{i,j}+AF_j]$, for all "J", where "J" denotes each and every successor activity of a plurality of such successor activities to at least one "I" activity and "$H_{i,j}$" denotes such at least one relationship float value relating to each and every such successor activity; and displaying, essentially continuously, by such at least one computational device, such at least one activity float value on such at least one time-scaled calendar on such at least one graphical user interface. In addition, it provides such a planning method, further comprising the steps of: calculating, by such at least one computational device, at least one cut float value relating to such at least one time-dependent relationship wherein such calculation comprises $CF_j=\min [\min[H_{i,j}+AF_j], H_{i,m}]$, where "$H_{i,m}$" denotes the such at least one relationship float value between such at least one "I" activity and a connected, one milestone deadline; and displaying, essentially continuously, by such at least one computational device, such at least one cut float value on such at least one time-scaled calendar on such at least one graphical user interface.

And, it provides such a planning method, further comprising the steps of: calculating, by such at least one computational device, at least one reverse float value relating to such at least one time-dependent relationship wherein such calculation comprises $RF_j=\min [RF_i+H_{i,j}]$, for all "I", where "I" denotes each and every predecessor activity of a plurality of such predecessor activities to at least one "J" activity and "$H_{i,j}$" denotes such at least one relationship float value relating to each and every such predecessor activity; and displaying, essentially continuously, by such at least one computational device, such at least one reverse float value on such at least one time-scaled calendar on such at least one graphical user interface. Further, it provides such a planning method, further comprising the steps of: re-positioning, by such at least one project planner using such at least one computational device, such at least one symbol representing each such activity of such at least two activities of such plurality of activities on such at least one time-scaled calendar on such at least one graphical user interface; re-calculating, by such at least one computational device, such at least one relationship float value relating to such at least one time-dependent relationship; and displaying, essentially continuously, by such at least one computational device, such re-calculated at least one relationship float value on such at least one time-scaled calendar on such at least one graphical user interface.

Even further, it provides such a planning method, further comprising the step of revising, by such at least one project planner using such at least one computational device, such at least one initial estimated duration for such at least one activity having such at least one time-dependent relationship on such at least one graphical user interface. Moreover, it provides such a planning method, further comprising the steps of: re-calculating, by such at least one computational device, at least one relationship float value relating to such at least one at least one (revised) time-dependent relationship; and displaying, essentially continuously, by such at least one computational device, such re-calculated at least one relationship float value on such at least one time-scaled calendar on such at least one graphical user interface. Additionally, it provides such a planning method, further comprising the steps of:

re-calculating, by such at least one computational device, at least one buffer float value relating to such at least one at least one (revised) time-dependent relationship; and displaying, essentially continuously, by such at least one computational device, such re-calculated at least one buffer float value on such at least one time-scaled calendar on such at least one graphical user interface. Also, it provides such a planning method, further comprising the step of: associating at least one daily resource requirement, by such at least one project planner using such at least one computational device, with such at least one symbol representing each such activity of such at least two activities of such plurality of activities on such at least one time-scaled calendar on such at least one graphical user interface; re-positioning, by such at least one project planner using such at least one computational device, such at least one symbol representing each such activity of such at least two activities of such plurality of activities on such at least one time-scaled calendar on such at least one graphical user interface; re-calculating, by such at least one computational device, increment and daily resource requirements, for at least one distinct resource, relating to at least one such activity repositioning; and displaying, essentially continuously, by such at least one computational device, re-calculated daily resource requirement values on such at least one time-scaled calendar on such at least one graphical user interface. In addition, it provides such a planning method, further comprising the step of: providing at least one daily resource requirement calculation to calculate at least one increment in daily resource requirements, for at least one distinct resource, relating to the positioning of at least one such activity wherein such calculation comprises $RES_n = RES_n + R_i$, where "n" denotes every day between the planned dates for activity "I" and "$R_i$" denotes the resource daily rate for activity "I;" calculating, by such at least one computational device, the at least one increment in daily resource requirements, for at least one distinct resource, relating to the positioning of at least one such activity and displaying, essentially continuously, by such at least one computational device, such at least one resource requirement value on such at least one time-scaled calendar on such at least one graphical user interface.

Moreover, it provides such a planning method, wherein each activity of such plurality of activities further comprises any of the following: estimated daily resource rates; initial estimated time-cost data; and initial duration probability distribution function. Further, it provides such a planning method, further comprising the steps of: re-calculating, by such at least one computational device, at least one activity float value relating to such at least one at least one (revised) time-dependent relationship; and displaying, essentially continuously, by such at least one computational device, re-calculated at least one activity float value on such at least one time-scaled calendar on such at least one graphical user interface. Even further, it provides such a planning method, further comprising the steps of: re-calculating, by such at least one computational device, at least one cut float value relating to such at least one at least one (revised) time-dependent relationship; and; displaying, essentially continuously, by such at least one computational device, such re-calculated at least one cut float value on such at least one time-scaled calendar on such at least one graphical user interface. Moreover, it provides such a planning method, further comprising the steps of: re-calculating, by such at least one computational device, at least one reverse float value relating to such at least one at least one (revised) time-dependent relationship; and displaying, essentially continuously, by such at least one computational device, such re-calculated at least one reverse float value on such at least one time-scaled calendar on such at least one graphical user interface.

Additionally, it provides such a planning method, further comprising the step of: associating time-cost data, by such at least one project planner using such at least one computational device, with such at least one symbol representing each such activity of such at least two activities of such plurality of activities on such at least one time-scaled calendar on such at least one graphical user interface; re-positioning, by such at least one project planner using such at least one computational device, such at least one symbol representing each such activity of such at least two activities of such plurality of activities on such at least one time-scaled calendar on such at least one graphical user interface; re-calculating, by such at least one computational device, such time-cost data, relating to at least one such activity repositioning, to provide at least one re-calculated time-cost profile; and displaying, essentially continuously, by such at least one computational device, such at least one re-calculated time-cost profile on such at least one time-scaled calendar on such at least one graphical user interface. Also, it provides such a planning method, further comprising the step of: associating duration probability distribution functions, by such at least one project planner using such at least one computational device, with such at least one symbol representing each such activity of such at least two activities of such plurality of activities on such at least one time-scaled calendar on such at least one graphical user interface; re-positioning, by such at least one project planner using such at least one computational device, such at least one symbol representing each such activity of such at least two activities of such plurality of activities on such at least one time-scaled calendar on such at least one graphical user interface; re-calculating, by such at least one computational device, such duration probability distribution functions, relating to at least one such activity repositioning, to provide at least one project risk profile; and displaying, essentially continuously, by such at least one computational device, such at least one project risk profile on such at least one time-scaled calendar on such at least one graphical user interface. In addition, it provides such a planning method, wherein such step of selecting, on such at least one computational device, by such at least one project planner, at least one time-dependent relationship between such at least two activities comprises the step of selecting, on such at least one computational device, such at least one time-dependent relationship between any first activity embedded node, intermediate of the start and finish nodes of such at least one first activity, and any of the following: at least one activity start node of at least one second activity; at least one activity finish node of such at least one second activity; at least one milestone deadline; and at least one second activity embedded node, intermediate of the start and finish nodes of such at least one second activity. And, it provides such a planning method, wherein such at least one time-dependent relationship comprises "from such at least one first activity start node to such at least one second activity embedded node" relationship.

Further, it provides such a planning method, wherein such at least one time-dependent relationship comprises "from such at least one first activity embedded node to such at least one second activity start node" relationship. Even further, it provides such a planning method, wherein such at least one time-dependent relationship comprises "from such at least one first activity finish node to such at least one second activity embedded node" relationship. Moreover, it provides such a planning method, wherein such at least one time-dependent relationship comprises "from such at least one first activity embedded node to such at least one second activity finish node" relationship. Additionally, it provides such a planning method, wherein such at least one time-dependent relationship comprises "from such at least one first activity embedded node to such at least one milestone deadline" relationship. Also, it provides such a planning method, wherein such at least one time-dependent relationship comprises "from such at least one first embedded node to such at least one second embedded node" relationship. In accordance with another preferred embodiment hereof, this invention provides a planning method, relating to at least one project including a plurality of activities, for use by at least one project planner, comprising the step of selecting, on such at least one computational device, such at least one time-dependent relationship between any first activity embedded node, intermediate of the start and finish nodes of at least one first activity, any of the following: at least one activity start node of at least one second activity; at least one activity finish node of at least one second activity; at least one milestone deadline; and at least one second activity embedded node, intermediate of the start and finish nodes of such at least one second activity. In addition, it provides such a planning method, wherein such at least one time-dependent relationship comprises "from such at least one first activity start node to such at least one second activity embedded node" relationship. And, it provides such a planning method, wherein such at least one time-dependent relationship comprises "from such at least one first activity embedded node to such at least one second activity start node" relationship.

Further, it provides such a planning method, wherein such at least one time-dependent relationship comprises "from such at least one first activity finish node to such at least one second activity embedded node" relationship. Even further, it provides such a planning method, wherein such at least one time-dependent relationship comprises "from such at least one first activity embedded node to such at least one second activity finish node" relationship. Moreover, it provides such a planning method, wherein such at least one time-dependent relationship comprises "from such at least one first activity embedded node to such at least one milestone deadline" relationship. Additionally, it provides such a planning method, wherein such at least one time-dependent relationship comprises "from such at least one first activity embedded node to such at least one second activity embedded node" relationship.

In accordance with another preferred embodiment hereof, this invention provides a planning method, relating to at least one project, for use by at least one project planner, comprising the steps of: providing at least one computational device having at least one graphical user interface manipulable graphically by at least one project planner; positioning, by such at least one project planner using such at least one computational device, of at least one first symbol representing each of at least two such activities of a plurality of activities relating to such at least one project, each such activity having at least one initial estimated duration, on at least one time-scaled calendar on such at least one graphical user interface; designating, by such at least one project planner using such at least one computational device, within such at least one graphical user interface, at least one time-dependent relationship between at least two of such plurality of activities relating to such at least one project; wherein such at least one time-dependent relationship between at least two such activities of such plurality of activities is essentially continuously displayed, wherein at least one relationship float value relating to such at least one time-dependent relationship is essentially continuously calculated; wherein such at least one relationship float value ($H_{i,j}$) calculation comprises $H_{i,j}=H_j-H_i$, where $H_j$ denotes the connection date to at least one successor activity "J" of a plurality of such successor activities and "H" denotes the connection date from at least one predecessor activity "I" of a plurality of such predecessor activities; wherein such calculated at least one relationship float value is essentially continuously displayed; performing a series of re-positions comprising at least one re-positioning, by such at least one project planner using such at least one computational device, such at least one first symbol representing such at least one activity having such at least one time-dependent relationship on such at least one time-scaled calendar on such at least one graphical user interface; responsive to such at least one repositioning(s), re-calculating, by such at least one computational device, such at least one relationship float value relating to such at least one at least one time-dependent relationship; and responsive to such re-calculation(s), displaying, essentially continuously, by such at least one computational device, such re-calculated at least one relationship float value on such at least one time-scaled calendar on such at least one graphical user interface.

Also, it provides such a planning method, further comprising the steps of: calculating, by such at least one computational device, at least one buffer float value relating to such at least one time-dependent relationship wherein such calculation comprises $BF_i=\min[H_{i,j}]$, for all "J", where "J" denotes each and every successor activity of a plurality of such successor activities to at least one "I" activity and "$H_{ij}$" denotes such at least one relationship float value relating to each and every such successor activity; and displaying, essentially continuously, by such at least one computational device, such at least one buffer float value on such at least one time-scaled calendar on such at least one graphical user interface. In addition, it provides such a planning method, further comprising the steps of: re-calculating, by such at least one computational device, such at least one buffer float value; and displaying, essentially continuously, by such at least one computational device, such re-calculated at least one buffer float value on such at least one time-scaled calendar on such at least one graphical user interface. And, it provides such a planning method, further comprising the steps of: calculating, by such at least one computational device, at least one activity float value relating to such at least one time-dependent relationship wherein such calculation comprises $AFi=\min[H_{i,j}+AF_j]$, for all "J", where "J" denotes each and every successor activity of a plurality of such successor activities to at least one "I" activity and "$H_{ij}$" denotes such at least one relationship float value relating to each and every such successor activity; and displaying, essentially continuously, by such at least one computational device, such at least one activity float value on such at least one time-scaled calendar on such at least one graphical user interface. Further, it provides such a planning method, further comprising the steps of: re-calculating, by such at least one computational device, such at least one activity float value; and displaying, essentially continuously, by such at least one computational device, such re-calculated at least one activity float value on such at least one time-scaled calendar on such at least one graphical user interface. Even further, it provides such a planning method, wherein: calculating, by such at least one computational device, at least one cut float value relating to such at least one time-dependent relationship wherein such calculation comprises $CF_i=\min[\min[H_{i,j}+AF_j], H_{i,m}]$ where "$H_{i,j}$" denotes the such at least one relationship float value between such at least one "I" activity and a connected, one milestone deadline; and displaying, essentially continuously, by such at least one computational device, such at least one cut float value on such at least one time-scaled calendar on such at least one graphical user interface.

Moreover, it provides such a planning method, further comprising the steps of: re-calculating, by such at least one computational device, such at least one cut float value; and displaying, essentially continuously, by such at least one computational device, such re-calculated at least one cut float value on such at least one time-scaled calendar on such at least one graphical user interface. Additionally, it provides such a planning method, wherein: calculating, by such at least one computational device, at least one reverse float value relating to such at least one time-dependent relationship wherein such calculation comprises $RF_j=\min [RF_i+H_{i,j}]$, for all "I", where "I" denotes each and every predecessor activity of a plurality of such predecessor activities to at least one "J" activity and "$H_{i,j}$" denotes such at least one relationship float value relating to each and every such predecessor activity; and displaying, essentially continuously, by such at least one computational device, such at least one reverse float value on such at least one time-scaled calendar on such at least one graphical user interface. Also, it provides such a planning method, further comprising the steps of: re-calculating, by such at least one computational device, such at least one reverse float value; and displaying, essentially continuously, by such at least one computational device, such re-calculated at least one reverse float value on such at least one time-scaled calendar on such least one graphical user interface.

In accordance with another preferred embodiment hereof, this invention provides a computer program system relating to assisting at least one user relating to project planning and scheduling comprising the steps of: permitting selecting by such at least one project planner, at least one time-scaled calendar on at least one graphical user interface; permitting identifying, by such least one project planner, a plurality of activities relating to such at least one project having at least one initial estimated duration for each of such plurality of activities on such at least one graphical user interface; permitting positioning, by such at least one project planner at least one symbol representing each of at least two activities of such plurality of activities on such at least one time-scaled calendar on such at least one graphical user interface; permitting designating, by such at least one project planner, at least one time-dependent relationship between such at least two activities; calculating at least one relationship float value relating to such at least one at least one time-dependent relationship; displaying, essentially continuously such calculated at least one relationship float value on such at least one time-scaled calendar on such at least one graphical user interface; and storing at least one project plan, wherein such at least one project plan comprises at least at least two of such activities relating to at least one project, such position of such at least one symbol representing such at least one activity on such selected at least on time-scaled calendar, such at least one initial estimated duration relating to such at least one activity, such at least one time-scaled calendar, such at least one time-dependent relationship between such at least two activities, and such calculated at least one relationship float value. In addition, it provides such a computer program system, wherein such at least one relationship float value ($H_{i,j}$) calculation comprises $H_{i,j}=H_i-H_j$, where "$H_j$" denotes the connection date to at least one successor activity "J" of a plurality of such successor activities and "$H_i$" denotes the connection date from at least one predecessor activity "I" of a plurality of such predecessor activities. And, it provides such a computer program system, further comprising the steps of: calculating at least one buffer float value relating to such at least one time-dependent relationship wherein such calculation comprises $BF_i=\min [H_{i,j}]$, for all "J", where "J" denotes each and every successor activity of a plurality of such successor activities to at least one "I" activity and "$H_{i,j}$" denotes such at least one relationship float value relating to each and every such successor activity; and displaying, essentially continuously such at least one buffer float value on such at least one time-scaled calendar on such at least one graphical user interface.

Further, it provides such a computer program system, further comprising the steps of: calculating at least one activity float value relating to such at least one time-dependent relationship wherein such calculation comprises $AF_i=\min [H_{i,j}+AF_j]$, for all "J", where "J" denotes each and every successor activity of a plurality of such successor activities to at least one "I" activity and "$R_{i,j}$" denotes such at least one relationship float value relating to each and every such successor activity; and displaying, essentially continuously such at least one activity float value on such at least one time-scaled calendar on such at least one graphical user interface. Even further, it provides such a computer program system, further comprising the steps of: calculating at least one cut float value relating to such at least one time-dependent relationship wherein such calculation comprises $CF_i=\min [\min[H_{i,j}+AF_j], H_{i,m}]$ where "$H_{i,j}$" denotes the such at least one relationship float value between such at least one "I" activity and a connected, one milestone deadline; and displaying, essentially continuously such at least one cut float value on such at least one time-scaled calendar on such at least one graphical user interface. Moreover, it provides such a computer program system, further comprising the steps of: calculating at least one reverse float value relating to such at least one time-dependent relationship wherein such calculation comprises $RF_j=\min [RF_i+H_{i,j}]$, for all "I", where "I" denotes each and every predecessor activity of a plurality of such predecessor activities to at least one "J" activity and "$R_{i,j}$" denotes such at least one relationship float value relating to each and every such predecessor activity; and displaying, essentially continuously, by such at least one computational device, such at least one reverse float value on such at least one time-scaled calendar on such at least one graphical user interface.

Additionally, it provides such a computer program system, further comprising the steps of: permitting re-positioning, by such at least one project planner, such at least one symbol representing each of at least two activities of such plurality of activities on such at least one time-scaled calendar on such at least one graphical user interface; re-calculating such at least one relationship float value relating to such at least one at least one time-dependent relationship; and displaying, essentially continuously, such re-calculated at least one relationship float value on such at least one time-scaled calendar on such at least one graphical user interface. Also, it provides such a computer program system, further comprising the step of permitting revising, by such at least one project planner, such at least one initial estimated duration relating to such at least one activity having such at least one time-dependent relationship on such at least one graphical user interface. In addition, it provides such a computer program system, further comprising the steps of: re-calculating at least one buffer float value relating to such at least one at least one time-dependent relationship; and displaying, essentially continuously, such re-calculated at least one buffer float value on such at least one time-scaled calendar on such at least one graphical user interface. And, it provides such a computer program system, further comprising the steps of: re-calculating at least one activity float value relating to such at least one at least one time-dependent relationship; and displaying, essentially continuously, such re-calculated at least one activity float value on such at least one time-scaled calendar on such at least one graphical user interface. Further, it provides such a computer program system, further comprising the steps of: re-calculating at least one cut float value relating to such at least one at least one time-dependent relationship; and displaying, essentially continuously, such re-calculated at least one cut float value on such at least one time-scaled calendar on such at least one graphical user interface. Even further, it provides such a computer program system, further comprising the steps of: re-calculating at least one reverse float value relating to such at least one at least one time-dependent relationship; and displaying, essentially continuously, such re-calculated at least one reverse float value on such at least one time-scaled calendar on such at least one graphical user interface.

Moreover, it provides such a computer program system, wherein such at least one time-dependent relationship includes such relationship between any first activity embedded node, intermediate of the start and finish nodes of such at least one first activity, and any of the following: at least one activity start node of at least one second activity; at least one activity finish node of at least one second activity; at least one milestone deadline; and at least one second activity embedded node, intermediate of the start and finish nodes of such at least one second activity. Additionally, it provides such a computer program system, wherein such at least one time-dependent relationship comprises at least one first activity start node to such at least one second activity embedded node relationship. Also, it provides such a computer program system, wherein such at least one time-dependent relationship comprises at least one first activity embedded node to at least one second activity start node relationship. In addition, it provides such a computer program system, wherein such at least one time-dependent relationship comprises at least one first activity finish node to at least one second activity embedded node relationship. And, it provides such a computer program system, wherein such at least one time-dependent relationship comprises at least one first activity embedded node to at least one second activity finish node relationship. Further, it provides such a computer program system, wherein such at least one time-dependent relationship comprises at least one first activity embedded node to at least one milestone deadline relationship. Even further, it provides such a computer program system, wherein such at least one time-dependent relationship comprises at least one first activity embedded node to at least one second activity embedded node relationship.

In accordance with another preferred embodiment hereof, this invention provides a computer program system, relating to assisting at least one user relating to project planning and scheduling, comprising: at least one first computer interface structured and arranged to permit selecting, by such at least one project planner, at least one time-scaled calendar on at least one graphical user interface; at least one second computer interface structured and arranged to permit identifying, by such at least one project planner, a plurality of activities relating to such at least one project having at least one initial estimated duration for each of such plurality of activities on such at least one graphical user interface; at least one third computer interface structured and arranged to permit positioning, by such at least one project planner, of at least one symbol representing each of at least two activities of such plurality of activities on such at least one time-scaled calendar on such at least one graphical user interface; at least one fourth computer interface structured and arranged to permit designating, by such at least one project planner, at least one time-dependent relationship between such at least two activities; at least one first computer processor structured and arranged to calculate at least one relationship float value relating to such at least one time-dependent relationship; at least one fifth computer interface structured and arranged to display, essentially continuously, such calculated at least one relationship float value on such at least one time-scaled calendar on such at least one graphical user interface; and at least one first computer data base structured and arranged to store at least one project plan wherein such at least one project plan comprises at least at least two of such activities relating to at least one project, such position of such at least one symbol representing such at least one activity on such selected at least on time-scaled calendar, such at least one initial estimated duration relating to such at least one activity, such at least one time-scaled calendar, such at least one time-dependent relationship between such at least two activities, and such calculated at least one relationship float value. Moreover, it provides such a computer program system, wherein such at least one relationship float value ($H_{i,j}$) calculation comprises $H_{i,j}=H_j-H_i$; where "$H_j$" denotes the connection date to at least one successor activity "J" of a plurality of such successor activities and "$H_i$" denotes the connection date from at least one predecessor activity "I" of a plurality of such predecessor activities. Additionally, it provides such a computer program system, further comprising: at least one second computer processor structured and arranged to calculate at least one buffer float value relating to such at least one time-dependent relationship wherein such calculation comprises $BF_i=\min[H_{i,j}]$, for all "J", where "J" denotes each and every successor activity of a plurality of such successor activities to at least one "I" activity and "$H_{i,j}$" denotes such at least one relationship float value relating to each and every such successor activity; and at least one sixth computer interface structured and arranged to display, essentially continuously such at least one buffer float value on such at least one time-scaled calendar on such at least one graphical user interface. Also, it provides such a computer program system, further comprising: at least one second computer processor structured and arranged to calculate at least one activity float value relating to such at least one time-dependent relationship wherein such calculation comprises $AF_i=\min[H_{i,j}+AF_j]$, for all "J", where "J" denotes each and every successor activity of a plurality of such successor activities to at least one "I" activity and "$H_{i,j}$" denotes such at least one relationship float value relating to each and every such successor activity; and at least one seventh computer interface structured and arranged to display, essentially continuously such at least one activity float value on such at least one time-scaled calendar on such at least one graphical user interface. In addition, it provides such a computer program system, further comprising: at least one fourth computer processor structured and arranged to calculate at least one cut float value relating to such at least one time-dependent relationship wherein such calculation comprises $CF_i=\min[\min[H_{i,j}+AF_j], H_{i,m}]$ where "$H_{i,m}$" denotes the such at least one relationship float value between such at least one "I" activity and a connected, later at least one milestone; and at least one eighth computer interface structured and arranged to display, essentially continuously such at least one cut float value on such at least one time-scaled calendar on such at least one graphical user interface. And, it provides such a computer program system, further comprising: at least one fifth computer processor structured and arranged to calculate at least one reverse float value relating to such at least one time-dependent relationship wherein such calculation comprises $RF_j=\min[RF_i+H_{i,j}]$, for all "I", where "I" denotes each and every predecessor activity of a plurality of such predecessor activities to at least one "J" activity and "$H_{i,j}$" denotes such at least one relationship float value relating to each and every such predecessor activity; and at least one ninth computer interface structured and arranged to display, essentially continuously, by such at least one computational device, such at least one reverse float value on such at least one time-scaled calendar on such at least one graphical user interface.

Further, it provides such a computer program system, further comprising: at least one tenth computer interface structured and arranged to permit re-positioning, by such at least one project planner, such at least one symbol representing each of at least two activities of such plurality of activities on such at least one time-scaled calendar on such at least one graphical user interface; and at least one sixth computer processor structured and arranged to re-calculate such at least one relationship float value relating to such at least one at least one time-dependent relationship; and at least one eleventh computer interface structured and arranged to display, essentially continuously, such re-calculated at least one relationship float value on such at least one time-scaled calendar on such at least one graphical user interface. Even further, it provides such a computer program system, further comprising at least one twelfth computer interface structured and arranged to permit revising, by such at least one project planner, such at least one initial estimated duration relating to such at least one activity having such at least one time-dependent relationship on such at least one graphical user interface.

Moreover, it provides such a computer program system, further comprising: at least one seventh computer processor structured and arranged to re-calculate such at least one buffer float value relating to such at least one at least one time-dependent relationship; and at least one thirteenth computer interface structured and arranged to display, essentially continuously, such re-calculated at least one buffer float value on such at least one time-scaled calendar on such at least one graphical user interface. Additionally, it provides such a computer program system, further comprising: at least one eighth computer processor structured and arranged to re-calculate such at least one activity float value relating to such at least one at least one time-dependent relationship; and at least one fourteenth computer interface structured and arranged to display, essentially continuously, such re-calculated at least one activity float value on such at least one time-scaled calendar on such at least one graphical user interface. Also, it provides such a computer program system, further comprising: at least one ninth computer processor structured and arranged to re-calculate such at least one cut float value relating to such at least one at least one time-dependent relationship; and at least one fifteenth computer interface structured and arranged to display, essentially continuously, such re-calculated at least one cut float value on such at least one time-scaled calendar on such at least one graphical user interface.

In addition, it provides such a computer program system, further comprising: at least one tenth computer processor structured and arranged to re-calculate such at least one reverse float value relating to such at least one at least one time-dependent relationship; and at least one sixteenth computer interface structured and arranged to display, essentially continuously, such re-calculated at least one reverse float value on such at least one time-scaled calendar on such at least one graphical user interface. And, it provides such a computer program system, wherein such at least one time-dependent relationship includes such relationship between any first activity embedded node, intermediate of the start and finish nodes of such at least one first activity, and any of the following: at least one activity start node of of at least one second activity; at least one activity finish node of at least one second activity; at least one milestone deadline; and at least one second activity embedded node, intermediate of the start and finish nodes of at least one second activity.

Further, it provides such a computer program system, wherein such at least one time-dependent relationship comprises at least one first activity start node to such at least one second activity embedded node relationship. Even further, it provides such a computer program system, wherein such at least one time-dependent relationship comprises at least one first activity embedded node to at least one second activity start node relationship. Moreover, it provides such a computer program system, wherein such at least one time-dependent relationship comprises at least one first activity finish node to at least one second activity embedded node relationship. Additionally, it provides such a computer program system, wherein such at least one time-dependent relationship comprises at least one first activity embedded node to at least one second activity finish node relationship. Also, it provides such a computer program system, wherein such at least one time-dependent relationship comprises at least one first activity embedded node to at least one milestone deadline relationship. In addition, it provides such a computer program system, wherein such at least one time-dependent relationship comprises at least one first activity embedded node to at least one second activity embedded node relationship.

In accordance with another preferred embodiment hereof, this invention provides a method, relating to providing interactive program services relating to project planning and scheduling, comprising the steps of: providing at least one computational device structured and arranged to comprise at least one manipulable graphical user interface and to calculate and display for interface data relating to a plurality of activities, critical path information and float information relating to such plurality of activities relating to at least one project plan wherein such at least one computational device is structured and arranged to be useful even by untrained project planners; and offering such at least one computational device to nontraditional customers for use in project planning by naive users. And, it provides such a method wherein such non-traditional customers are classroom educators. Further, it provides such a method wherein such naive users are students. Even further, it provides such a method wherein such students are elementary school students. Even further, it provides such a method wherein such naive users are students. Even further, it provides such a method wherein such students are elementary school students.

In accordance with another preferred embodiment hereof, this invention provides a method, relating to providing interactive program services relating to project planning and scheduling, comprising the steps of: providing at least one computational device structured and arranged to comprise at least one manipulable graphical user interface and to calculate and display for interface data relating to a plurality of activities, critical path information and float information relating to such plurality of activities relating to at least one project plan wherein such at least one computational device is structured and arranged to be useful to even untrained project planners; and offering Internet-based use of such at least one computational device to at least one project planner for use in project planning. Even further, it provides such a method, further comprising the steps of: permitting Internet-based use of such at least one computational device by such at least one project planner to input and manipulate such plurality of activities; calculating at least one count of such plurality of activities input by such at least one project planner; calculating at least one usage fee based on such at least one count; and receiving payment relating to such calculated at least one usage fee from such at least one project planner.

In accordance with another preferred embodiment hereof, this invention provides a method, relating to providing interactive program services relating to project planning and scheduling, comprising the steps of: providing at least one computational device structured and arranged to comprise at least one manipulable graphical user interface and to calculate and display for interface data relating to a plurality of activities, critical path information and float information relating to such plurality of activities relating to at least one project plan wherein such at least one computational device is structured and arranged to be useful to even untrained project planners; and offering Internet-based use of such at least one computational device to at least one first project planner for use in project planning. Even further, it provides such a method, further comprising the steps of: permitting Internet-based use of such at least one computational device by such at least one first project planner to input and manipulate such plurality of activities relating to completion of such at least one project plan; permitting storing of such completed at least one project plan in at least one project plan data base; receiving permission from such at least one first project planner to make such at least one stored project plan available to at least one second project planner as at least one project template; and permitting Internet-based access to such at least one stored project plan by such at least one second project planner.

In accordance with another preferred embodiment hereof, this invention provides a method, relating to providing interactive program services relating to project planning and scheduling, comprising the steps of: providing at least one computational device structured and arranged to comprise at least one manipulable graphical user interface and to calculate and display for interface data relating to a plurality of activities, critical path information and float information relating to such plurality of activities relating to at least one project plan wherein such at least one computational device is structured and arranged to be useful to even untrained project planners; and offering use of such at least one computational device to at least one first project planner for use in project planning. Even further, it provides such a method, further comprising the steps of: offering such at least one computational device to non-traditional customers for use in project planning by naive users wherein such non-traditional customers are classroom educators, and wherein such naive users are students; offering Internet-based use of such at least one computational device to at least one first project planner for completion of at least one project plan; and receiving permission from such at least one first project planner to make such at least one completed project plan available to at least one second project planner as at least one project template.

In accordance with another preferred embodiment hereof, this invention provides a planning method, relating to at least one project, for use by at least one project planner, comprising the steps of: providing at least one computational device having at least one graphical user interface manipulable graphically by at least one project planner; identifying, by such least one project planner, a plurality of activities relating to such at least one project, each activity of such plurality of activities having at least one initial estimated duration; selecting on such at least one computational device, by such at least one project planner, at least one time-scaled calendar to display on such at least one graphical user interface; positioning, by such at least one project planner using such at least one computational device, of at least one symbol representing each of at least two such activities on such at least one time-scaled calendar on such at least one graphical user interface; selecting, on such at least one computational device, by such at least one project planner, at least one time-dependent relationship between such at least two activities; calculating, by such at least one computational device, at least one relationship float value relating to such at least one time-dependent relationship; and wherein such at least one relationship float value ($H_{i,j}$) calculation comprises $H_{i,j}=H_j-H_i$; where "$H_j$" denotes the connection date to at least one successor activity "J" of a plurality of such successor activities and "$H_i$" denotes the connection date from at least one predecessor activity "I" of a plurality of such predecessor activities. Even further, it provides such a planning method, further comprising the step of calculating, by such at least one computational device, at least one buffer float value relating to such at least one time-dependent relationship wherein such calculation comprises $BF_i=\min[H_{i,j}]$, for all "J", where "J" denotes each and every successor activity of a plurality of such successor activities to at least one "I" activity and "$H_{i,j}$" denotes such at least one relationship float value relating to each and every such successor activity. Even further, it provides such a planning method, further comprising the step of calculating, by such at least one computational device, at least one activity float value relating to such at least one time-dependent relationship wherein such calculation comprises $AF_i=\min[H_{i,j}+AF_j]$, for all "J", wherein "J" denotes each and every successor activity of a plurality of such successor activities to at least one "I" activity and "$H_{i,j}$" denotes such at least one relationship float value relating to each and every such successor activity. Even further, it provides such a planning method, further comprising the step of calculating, by such at least one computational device, at least one cut float value relating to such at least one time-dependent relationship wherein such calculation comprises $CF_i=\min[\min[H_{i,j}+AF_j], H_{i,m}]$ wherein "$H_{iM}$" denotes the such at least one relationship float value between such at least one "I" activity and a connected, one milestone deadline. Even further, it provides such a planning method, further comprising the step of calculating, by such at least one computational device, at least one reverse float value relating to such at least one time-dependent relationship wherein such calculation comprises $RF_j=\min[RF_i+H_{i,j}]$, for all "I", wherein "I" denotes each and every predecessor activity of a plurality of such predecessor activities to at least one "J" activity and "$H_{i,j}$" denotes such at least one relationship float value relating to each and every such predecessor activity.

In accordance with another preferred embodiment hereof, this invention provides a planning method, relating to at least one project including a plurality of activities, for use by at least one project planner, comprising the step of selecting, on at least one computational device, at the option of such at least one project planner, time-dependent relationships between at least two activities of such plurality of activities relating at least to all the following combinations: between at least one first activity start node and at least one second activity start node; between such at least one first activity start node and at least one second activity finish node; between such at least one first activity start node and at least one milestone deadline; between such at least one first activity start node and at least one second activity embedded node, intermediate of the start and finish nodes of such at least one activity; between such at predecessor Activity may be slipped beyond its Position without delaying the successor Activity. In the Backward Planning mode, Buffer measures by how many days the successor Activity may be shifted earlier from its Position without forcing its predecessor to shift early.

Buffer Float (Also "bFloat")—Present invention-provided planning method calculation, which measures by how many days an Activity may be slipped beyond its Position without impacting any of its successor Activities, and which GPM™ calculates as the minimum of the relationship floats for all Logic Ties emanating from the Activity. A GPM™-perfected, conventional Free Float concept in that it homogenizes all Relationship types to a single calculation. Also referred to as "Buffer."

Cascading Style Sheet (CSS). In computing, Cascading Style Sheets (CSS) is a style sheet language used to describe the presentation of a document written in a markup language. It's most common application is to style web pages written in HTML and XHTML. The CSS specifications are maintained by the World Wide Web Consortium (W3C). CSS is used by both the authors and readers of web pages to define colors, fonts, layout, and other aspects of document presentation. It is designed primarily to enable the separation of document content (written in HTML or a similar markup language) from document presentation (written in CSS). Multiple style sheets can be imported, and alternative style sheets can be specified so that the user can choose between them. Different styles can be applied depending on the output device being used. For example, the screen version may be quite different from the printed version. This allows authors to tailor the presentation appropriately for each kind of media.

Client-Server. A model of interaction in a distributed system in which a program at one site sends a request to a program at another site and waits for a response. The requesting program is called the "client," and the program that responds to the request is called the "server." In the context of the World Wide Web, the client is typically a "Web browser" that runs on a user's computer; the program that responds to Web browser requests at a Web site is commonly referred to as a "Web server."

Constraint dates (Constraints). No-later-than (NLT) finish dates or no-earlier-than (NET) start dates for key activities in the overall schedule sequence. NLT constraints "choke down" total float. NET constraints force a later early schedule than otherwise; they choke down total float from that activity on-forward, but, depending on protocol, may increase float for predecessors.

Crashing. A term used to describe actions taken to decrease project duration after analyzing one or more possible alternatives to determine how to achieve the maximum reduction in time while minimizing associated cost increases. Activity Resource Rate (R). Required per day units of manpower, equipment, materials, funds or other specifically-defined resource estimated and applied to the activity.

Activity Time-Cost Data. Direct costs inversely associated with three possible durations for an activity, referred to as the crash, conventional or normal duration, each such duration assigned a corresponding crash (highest), conventional (mid) or normal (lowest) cost.

Arrow Diagramming Method (ADM). Activity-based network technique introduced with CPM in the late-50s. ADM uses arrows to represent activities, each arrow uniquely identified by the activity start node (also referred to as the I node or iNode) and the finish node (also referred to the J node or jNode). ADM restricts relationships from the predecessor finish jNode to the successor start iNode; thereby not permitting dependent activities to overlap, i.e., the start of the successor activity cannot be any earlier than the finish of the predecessor activity. On the other hand, if a number of activities (for example 2) share common successors (for example 3), all such 6 relationships interconnect efficiently through a single node: their common jNode.

Backward Planning—A protocol based on the predicate that the completion date of the project is known from which the start date for the project is to be calculated. In the Present invention-provided Backward Planning mode, the system determines the latest overall schedule start date and the minimum project duration from the given completion date Benchmark. An interim Milestone within the present invention-provided system, with a specified Cut Date, used to "throttle" aFloats "down" to cFloats, if Floats are to be allocated to the stage defined by the Benchmark as opposed to accumulating undisturbed from the schedule completion.

Buffer. A present invention-provided calculated relationship attribute. It measures the leeway between the predecessor and successor, namely: by how many days the predecessor Activity may be slipped beyond its Position without delaying the successor Activity. In the Backward Planning mode, Buffer measures by how many days the successor Activity may be shifted earlier from its Position without forcing its predecessor to shift early.

Buffer Float (Also "bFloat")—Present invention-provided planning method calculation, which measures by how many days an Activity may be slipped beyond its Position without impacting any of its successor Activities, and which GPM™ calculates as the minimum of the relationship floats for all Logic Ties emanating from the Activity. A GPM™-perfected, conventional Free Float concept in that it homogenizes all Relationship types to a single calculation. Also referred to as "Buffer."

Cascading Style Sheet (CSS). In computing, Cascading Style Sheets (CSS) is a style sheet language used to describe the presentation of a document written in a markup language. It's most common application is to style web pages written in HTML and XHTML. The CSS specifications are maintained by the World Wide Web Consortium (W3C). CSS is used by both the authors and readers of web pages to define colors, fonts, layout, and other aspects of document presentation. It is designed primarily to enable the separation of document content (written in HTML or a similar markup language) from document presentation (written in CSS). Multiple style sheets can be imported, and alternative style sheets can be specified so that the user can choose between them. Different styles can be applied depending on the output device being used. For example, the screen version may be quite different from the printed version. This allows authors to tailor the presentation appropriately for each kind of media.

Client-Server. A model of interaction in a distributed system in which a program at one site sends a request to a program at another site and waits for a response. The requesting program is called the "client," and the program that responds to the request is called the "server." In the context of the World Wide Web, the client is typically a "Web browser" that runs on a user's computer; the program that responds to Web browser requests at a Web site is commonly referred to as a "Web server."

Constraint dates (Constraints). No-later-than (NLT) finish dates or no-earlier-than (NET) start dates for key activities in the overall schedule sequence. NLT constraints "choke down" total float. NET constraints force a later early schedule than otherwise; they choke down total float from that activity on-forward, but, depending on protocol, may increase float for predecessors.

Crashing. A telm used to describe actions taken to decrease project duration after analyzing one or more possible alternatives to determine how to achieve the maximum reduction in time while minimizing associated cost increases.

Critical Path Method (CPM). Activity-based network technique that 1) advocates that planning be developed schematically and, preferably, disconnected from and ahead of scheduling; 2) calculates activity earliest and latest dates based on the schematic plan; and 3) requires a forward pass (early dates) to determine the earliest possible overall schedule completion, which is followed by a backward pass (late dates) to determine the critical path and total floats and free floats.

Criticality Index. A Monte Carlo analysis calculation that provides, for each activity, the percentage of the GPM plan iterations that the activity float for that activity was calculated as zero.

Cut Date. A present invention-provided Forward Planning date specified for a Benchmark, which operates analogously to a no-later-than date in conventional CPM calculations.

Cut Float (also "cFloat"). Present invention-provided planning method calculation, which measures how many days an activity may be slipped beyond its position without breaching the milestone deadline to which the activity is interconnecting through a relationship (logic tie or link). For any activity, cut float is at most equal to its activity float. Database. One or more large structured sets of persistent data maintained upon a computer system organized and structured according to a software system defining rules for organization as well responding to queries to read, write or modify data as well as provide statistical information regarding the contained data. As used herein for purposes of discussion, a database may be either a single unified system or a distributed system wherein certain database elements are located upon different systems, acting in harmony to appear as one unified database. Domain Name. The "www.domain.com" portion of the URL is called a "domain name." The domain name is a unique Internet alphanumeric address that identifies the virtual location of Internet resources related to a particular organization. For example, URLs containing the domain name "www.realtorXYZ.com" might include resources related to a company fictionally named Realtor XYZ.

Domain Name System (DNS). An Internet service that translates domain names (which are alphabetic identifiers) into IP addresses (which are numeric identifiers for machines on a TCP/IP network).

Early/Late Dates. Earliest/latest possible start and finish times for the activities based on activity durations, logic ties and constraints. Embedded Node (also eNode). Present invention-provided planning method notation, which symbolically denotes an event intermediate of the start and finish nodes of an activity, through which the activity is connected to the start or finish node or an embedded node of a successor activity or to a milestone deadline.

Extensible Markup Language (XML). XML describes a class of data objects known as XML documents and partially describes the behavior of computer programs which process these documents. More specifically, XML is a restricted form of the Standard Generalized Markup Language (also known as SGML). XML documents are made up of storage units defined as entities which in turn comprise either parsed or unparsed data in the form of characters or simply a character. XML is designed and intended to improve the functionality of the Internet by providing more flexible and adaptive forms of information. XML can be used to store any kind of structured information and in such encapsulated form, pass it between different computer systems which would otherwise be unable to communicate.

Finish-to-Finish (FF)—The logical relationship where completion of work on the successor activity cannot finish until the completion of work of the predecessor activity.

*Finish-to-Start (FS)—The logical relationship where initiation of work of the successor activity depends upon the completion of work of the predecessor.

Forward Float—Present invention-provided generic term meaning aFloat, bFloat or cFloat. Backward Float is an analogous term for Activity-related floats derived in the Backward Planning mode.

*Forward Pass—The calculation of the early start and early finish dates for the uncompleted portions of all network activities.

Forward Planning—A protocol based on the predicate that the start date of the project is known from which the completion date for the project is to be calculated. In the Forward Planning mode, the present invention-provided system determines the earliest overall schedule completion date and the minimum project duration from the given start date.

Free Float—Present invention-provided "expanded" definition comprising "the amount of time the early start (in SS or SF logic) or early finish (in FS or FF logic) of a schedule Activity can be delayed without delaying the early start (in FS or SS logic) or early finish (in FF or SF logic) of any immediately following Activities." In the present system, Free Float, if correctly calculated, and bFloat are the same, with bFloat the preferred term.

Graphical Planning Method (GPM™)—Present invention-provided activity-based network technique enabling the simplest possible scheme to connect Activities and create a network schedule in the shortest possible time. GPM™ advocates simultaneous planning and scheduling, using the schedule's time-scaled calendar and, without a second backward pass, calculates Buffers and Floats on-the-go as Activities, Logic Ties and Benchmarks are added to the schedule on user-specified Positions. GPM™ uses Forward/Backward Planning algorithms to determine the earliest overall schedule completion/the latest overall schedule start—along with Critical Paths, Buffers, Activity Floats/Reverse Floats, Cut Floats and Buffer Floats. Through its simple constructs, GPM simplifies planning processes and permits simultaneous interactive, network planning and scheduling by even inexperienced professionals and even inexperienced users.

iNode/jNode—An ADM notation also used by LDM, which represents a system of numbering the start/finish nodes in ADM or LDM. The iNode always symbolically denotes the start of the Activity; the jNode always symbolically denotes the finish.

Hammocking. Hammocks are used to show summaries of detailed logic as a simple activity for simplified reporting purposes. In general, detailed network schedule information is collapsed into summary network work schedules.

Hypertext Markup Language (HTML). A standard coding convention and set of codes for attaching presentation and linking attributes to informational content within documents. During a document authoring stage, the HTML codes (referred to as "tags") are embedded within the informational content of the document. When the Web document (or "HTML document") is subsequently transferred from a Web server to a Web browser, the codes are interpreted by the Web browser and used to parse and display the document. In addition to specifying how the Web browser is to display the document, HTML tags can be used to create links to other websites and other Web documents (commonly referred to as "hyperlinks"). For more information on HTML, see Ian S. Graham, The HTML Source Book, John Wiley and Sons, Inc., 1995 (ISBN 0471-11894-4).

Hypertext Transport Protocol (HTTP). The standard World Wide Web client-server protocol used for the exchange of information (such as HTML documents and client requests for such documents) between a Web browser and a Web server. HTTP includes a number of different types of messages that can be sent from the client to the server to request different types of server actions. For example, a "GET" message, which has the format GET, causes the server to return the document or file located at the specified Universal Resource Locator (URL).

HTTPS. HTTP over SSL (Secure Sockets Layer) can be best understood as a secure form of HTTP communication. Specifically, SSL is a protocol utilized for the authentication and encryption of HTTP traffic. In operation, the server and client exchange a set of encryption keys that are used to create a unique encryption key used to encrypt all data exchanged during the session.

I-J notation. Originally, an ADM system of numbering activity start/finish nodes. The I node always symbolically denotes the start of the Activity; the J node always symbolically denotes the finish of the activity.

Internet. A collection of interconnected (public and/or private) networks that are linked together by a set of standard protocols to form a distributed network. While this term is intended to refer to what is now commonly known as the Internet, it is also intended to encompass variations that may be made in the future, including changes and additions to existing standard protocols.

LAN. A Local Area Network of computer systems, typically within a building or office, permitting networking, the associated sharing of resources and files, such as application software, printers and client information, in an inter-office setting.

*Lead or Lag—A modification of a logical relationship that allows an acceleration of, or directs a delay in, the successor activity.

Link—Refer to definition of Logic Tie and/or Relationship. Logic Diagram Method (LDM). A preferred embodiment of the present invention-provided planning method, which represents an activity-based network technique that combines the strength of both ADM and PDM. In LDM, activities are shown as time-scaled, ADM-like lines with conventional I nodes and J nodes but with the added capability of having embedded nodes, from which activities may be linked to the start or finish of the successor (with or without any offsets, i.e., conventional lead/lag logic tie modifiers). LDM permits 12 possible relationship types, including the four conventional types of PDM activity-to-activity logic ties. LDM also allows activities (from their I node, J node or any embedded node) to be connected to any milestone; such logic ties are referred to as activity-to-milestone deadline relationships.

*Logical Relationship—A dependency between two schedule activities, or between a schedule activity and a milestone. Also called a Precedence Relationship. The four possible types of Relationships are FF, FS, SS and SF.

Microsoft IIS (Internet Information Services) Server. A set of Internet-based services for servers using Microsoft Windows.

Microsoft .net Framework. Commonly known as simply the .NET Framework, is a software development platform created by Microsoft. .NET Framework is a Microsoft technology that allows cross-language development and provides a large standard library. Other competing approaches are cross-platform languages, i.e. Perl, using a cross-platform runtime like the Java Virtual Machine, or compile standard ANSI C to each platform. Milestone. Present invention-provided planning method, which denotes an interim deadline with a fixed date between the start date of the schedule and the overall schedule completion date which will not automatically be adjusted as a result of changes to activities or relationships, and to which at least one activity is connected through a time-dependent relationship for the purposes of determining cut floats. Such milestone deadlines apportion the total float that might otherwise develop absent such deadlines to groups of activities as determined by the planner.

Monte Carlo Schedule Analysis. A technique that computes or iterates the plan many times using input values selected at random from probability distribution functions of possible durations, to calculate the distribution of possible completion dates for the plurality of activities comprising the plan at the time such analysis is performed.

One Pass. Present invention-provided calculation, either in the Forward Planning or Backward Planning mode, of Buffers and Floats for the currently completed portion of the schedule, based on planner-specified Activities, Positions, Relationships and Benchmarks.

Planned Dates—The planner-selected start date and finish date for any one Activity, which together establishes that Activity's Position. Also, referred to as selected dates, target dates, scheduled dates, should dates and other such like terms.

Position—The planner-selected, on the time-scaled calendar that the schedule will be portrayed, of Planned Start Date and Planned Finish Date for an Activity. Precedence Diagram Method (PDM)—Activity-based network technique that uses a box or a circle to represent an Activity and as many interconnected Links from the Activity as the number of its successor Activities. Any one such Link or connection may be from either the start or finish of the predecessor to either the start or finish of the successor, thereby recognizing 4 different types of Logic Ties, 3 of which permit interdependent activities to overlap, i.e., to be performed concurrently, to an extent.

PHP. (The initials come from the earliest version of the program, which was called "Personal Home Page Tools") A server-side, cross-platform, HTML-embedded scripting language used to create dynamic web pages. PHP is Open Source software. Planned Dates. The planner-selected start date and finish date for any one activity, which together establishes that activity's position. Also, referred to as selected dates, target dates, scheduled dates, should dates and other such like terms.

Precedence Diagram Method (PDM). Activity-based network technique that uses a box or a circle to represent an activity and as many interconnected links from the activity as the number of its successor activities. Any one such link or connection may be from either the start or finish of the predecessor to either the start or finish of the successor, thereby recognizing 4 different types of logic ties, 3 of which permit interdependent activities to overlap, i.e., to be performed concurrently, to an extent.

Relationship. In the present invention-provided system, it means a time-dependent Relationship either between two interconnected Activities or between an Activity and a Benchmark. In the present invention-provided system (GPM/LDM), the 12 possible types of Relationships are: finish-to-start; start-to-start/embed-to-start; finish-to-finish/finish-to-embed; start-to-finish/start-to-embed/embed-to-finish/embed-to-embed; finish-to-benchmark; start-to-benchmark/embed-to-benchmark.

Relationship Float (Also Gap). Present invention-provided planning method logic tie calculation, which measures the leeway between the predecessor and successor, namely, by how many days the predecessor activity may be slipped beyond its position without delaying the successor activity. In backward planning, buffer measures by how many days the successor activity may be shifted earlier from its position without forcing its predecessor to shift early.

Resource Requirements. Histogram displaying the units a resource is scheduled over the time-scaled calendar. Resource availability may be displayed as a line for comparison purposes.

Reverse Float (Also Back float or "rFloat") Present invention-provided calculated Backward Planning attribute, which measures by how many days an Activity may be shifted earlier from its Position without extending the schedule, i.e., without causing an earlier overall schedule start.

Resource Requirements. Histogram displaying the units a resource is scheduled over the time-scaled calendar. Resource availability may be displayed as a line for comparison purposes.

Reverse Float (Also Back float). Present invention-provided planning method backward planning calculation, which measures by how many days an activity may be shifted earlier from its position without extending the schedule, i.e., without causing an earlier overall schedule start.

Secure Sockets Layer (SSL)/Transport Layer Security (TLS). Cryptographic protocols that provide secure communications on the Internet for such things as web browsing, e-mail, Internet faxing, and other data transfers. There are slight differences between SSL 3.0 and TLS 1.0, but the protocol remains substantially the same. The SSL/TLS protocol(s) allow client/server applications to communicate in a way designed to prevent eavesdropping, tampering, and message forgery. SSL/TLS provides endpoint authentication and communications privacy over the Internet using cryptography.

Session ID. In the case of transport protocols which do not implement a formal session layer sessions are maintained by a higher level program using a method defined in the data being exchanged. For example, an HTTP exchange between a browser and a remote host may include an HTTP cookie which identifies state, such as a unique session ID, information about the user's preferences or authorization level.

*Start-to-Finish (SF). The logical relationship where completion of the successor schedule activity is dependent upon the initiation of the predecessor schedule activity.

*Start-to-Start (SS). The logical relationship where initiation of the work of the successor schedule activity is dependent upon the initiation of the work of the predecessor schedule activity.

Structured Query Language (SQL). SQL is a standard language used to communicate with relational database management systems (such as Oracle, Sybase, Microsoft SQL Server, Access, etc.) for the purpose of performing tasks such as data insertion, deletion, update, and general query for the return of data.

Total Float. CPM-calculated, Forward Planning-centric attribute, which measures the leeway in starting and/or finishing an Activity after its Early Dates without extending the schedule completion. The CPM Total Float is analogous to the GPM concept of aFloat in that they both accumulate undisturbed from the schedule completion.

Transmission Control Protocol/Internet Protocol (TCP/IP). A standard Internet protocol (or set of protocols) which specifies how two computers exchange data over the Internet. TCP/IP handles issues such as packetizing, packet addressing, and handshaking and error correction. For more information on TCP/IP, see Volumes I, II and III of Comer and Stevens, Internetworking with TCP/IP, Prentice Hall, Inc., ISBNs 0-13-468505-9 (vol. I), 0-13-125527-4 (vol. II), and 0-13-474222-2 (vol. III).

Uniform Resource Locator (URL). A unique address which fully specifies the location of a file or other resource on the Internet. The general format of a URL is protocol://machineaddress:port/path/filename. The port specification is optional, and, if not entered by the user the Web browser defaults to the standard port for whatever service is specified as the protocol. For example, if HTTP is specified as the protocol, the Web browser will use the HTTP default port. The machine address in this example is the domain name for the computer or device on which the file is located.

Web Browser. A software application that enables a user to display and interact with text, images, and other information typically located on a web page at a website on the World Wide Web or a local area network. Text and images on a web page can contain hyperlinks to other web pages at the same or different websites. Web browsers allow a user to quickly and easily access information provided on many web pages at many websites by traversing these links. Web browsers available for personal computers include Microsoft Internet Explorer, Mozilla, Firefox, Apple Safari, Netscape, and Opera. Web browsers are the most commonly used type of HTTP user agent. Although browsers are typically used to access the World Wide Web, they can also be used to access information provided by web servers in private networks or content in file systems.

WAN. A Wide Area Network, such as the Internet. Wireless Application Protocol (WAP). An open international standard for applications that use wireless communication. Its principal application is to enable access to the internet from a mobile phone or PDA (personal digital assistant). A WAP browser is designed to provide all of the basic services of a computer based web browser but simplified to operate within the restrictions of a mobile phone. WAP is now the protocol used for the majority of the world's mobile internet sites, known as WAP sites. Mobile internet sites, or WAP sites, are websites written in, or dynamically converted to, WML (Wireless Markup Language) and accessed via the WAP browser.

World Wide Web ("Web"). Used herein to refer generally to both (1) a distributed collection of interlinked, user-viewable hypertext documents (commonly refelTed to as "Web documents", "Web pages", "electronic pages" or "home pages") that are accessible via the Internet, and (2) the client and server software components that provide user access to such documents using standardized Internet protocols. Currently, the primary standard protocol for allowing applications to locate and acquire Web documents is the Hypertext Transfer Protocol (HTTP), and the electronic pages are encoded using the Hypertext Markup Language (HTML). However, the terms "World Wide Web" and "Web" are intended to encompass future markup languages and transport protocols that may be used in place of or in addition to the Hypertext Markup Language (HTML) and the Hypertext Transfer Protocol (HTTP).

It is noted that all definitions preceded by an asterisk are taken from the Glossary of the PMBOK Guide, Third Edition, in some instances with minor modifications for the sake of simplicity.

BRIEF DESCRIPTION OF THE DRAWINGS

FIG. 3 shows an example Activities Properties dialog box used to assist in identifying and placing activities on a Time- Scaled Calendar as used in the Interactive Graphics-Based Planning System according to a preferred embodiment of the present invention

DETAILED DESCRIPTION OF THE BEST MODES AND PREFERRED EMBODIMENTS OF THE INVENTION

Figure 1:
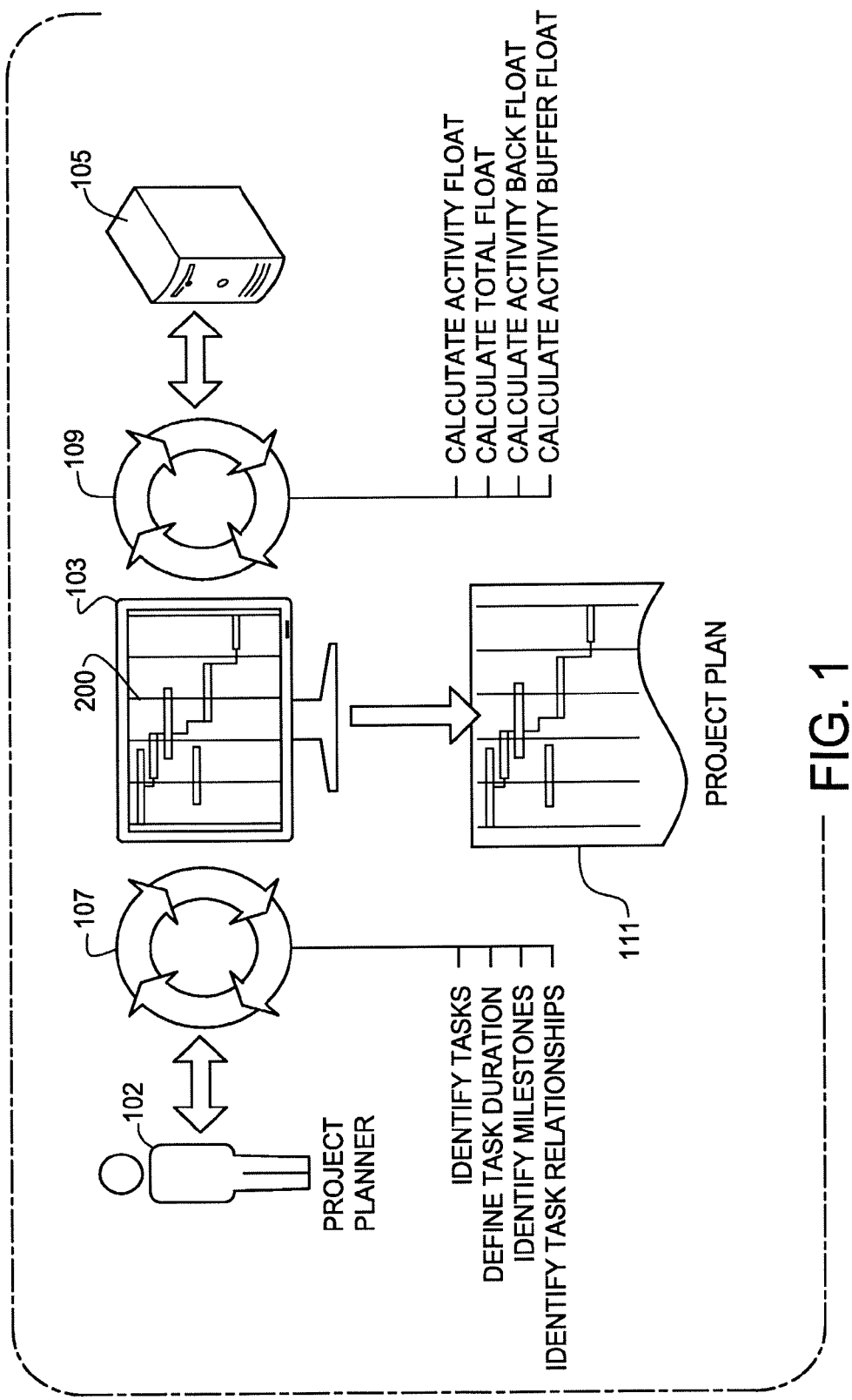
FIG. 1 shows a summary diagram illustrating the interactive planning and scheduling method provided by Interactive Graphics-Based Planning System according to a preferred embodiment of the present invention.
Figure 2A:
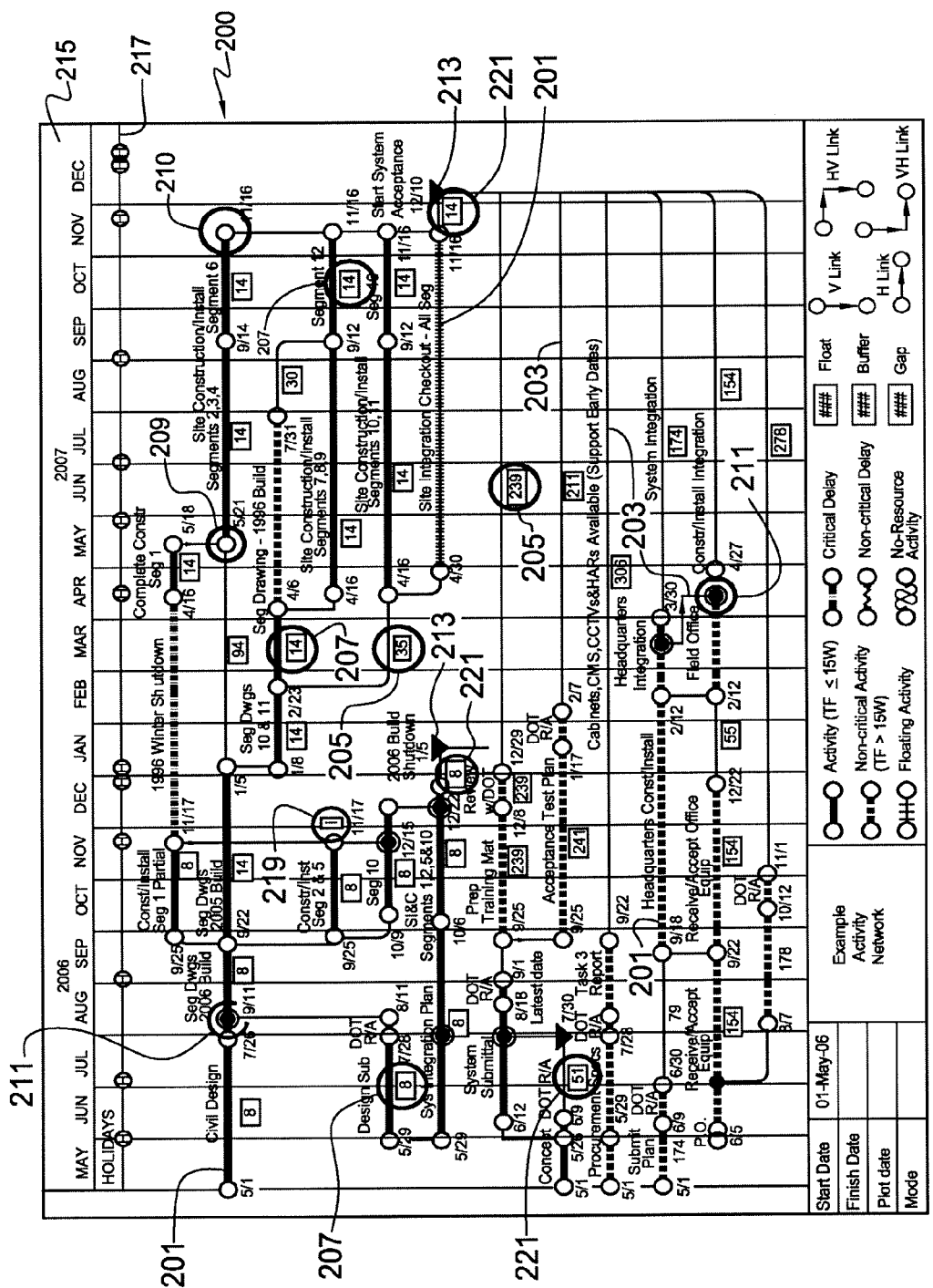
FIG. 2A shows a sample project schedule created through the use of the interactive planning and scheduling method provided by the Interactive Graphics-Based Planning System according to a preferred embodiment of the present invention.
Figure 2B:
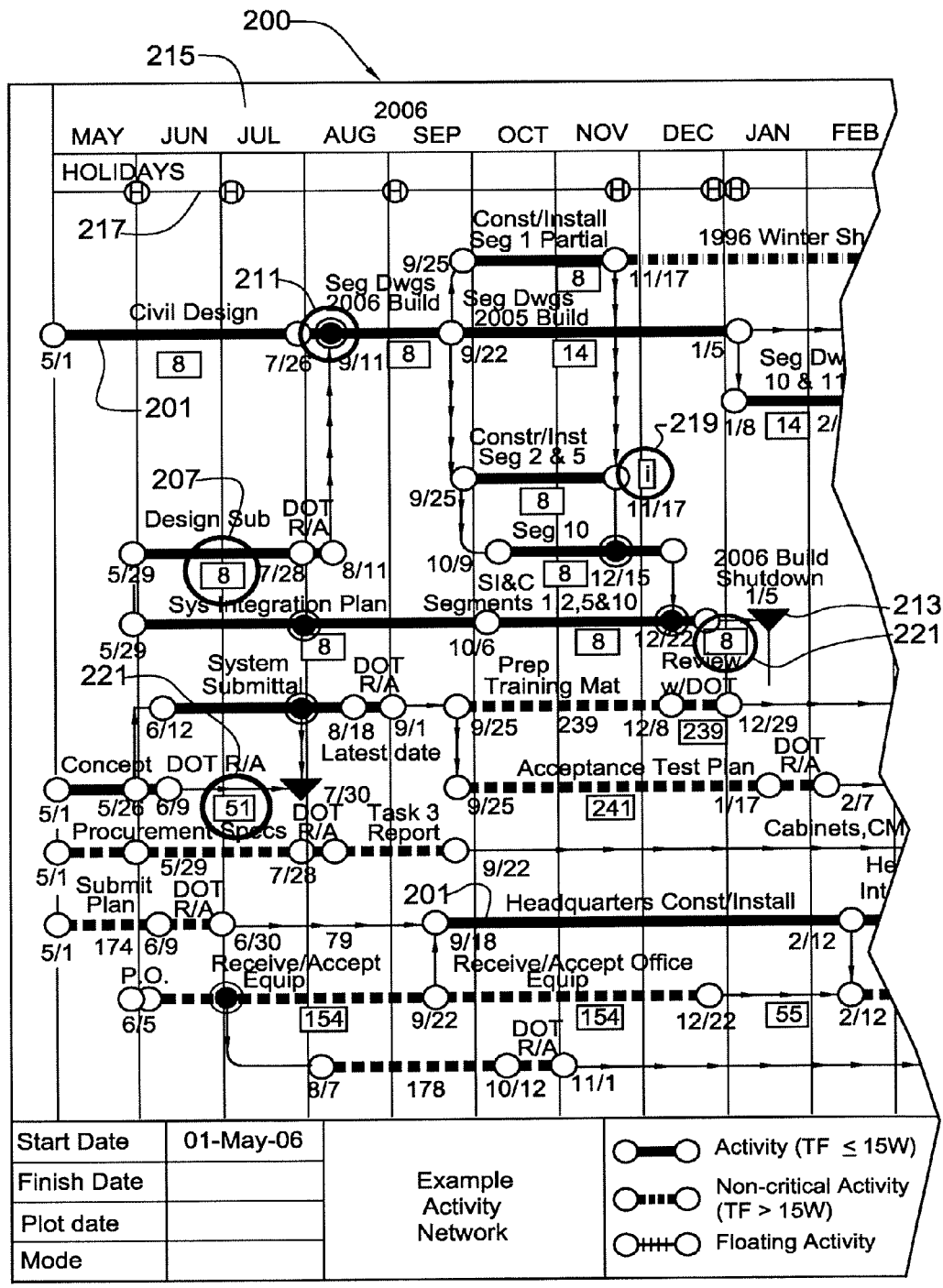
FIG. 2B shows an enlarged depiction of the left half of the sample project schedule of FIG. 2A.
Figure 2C:
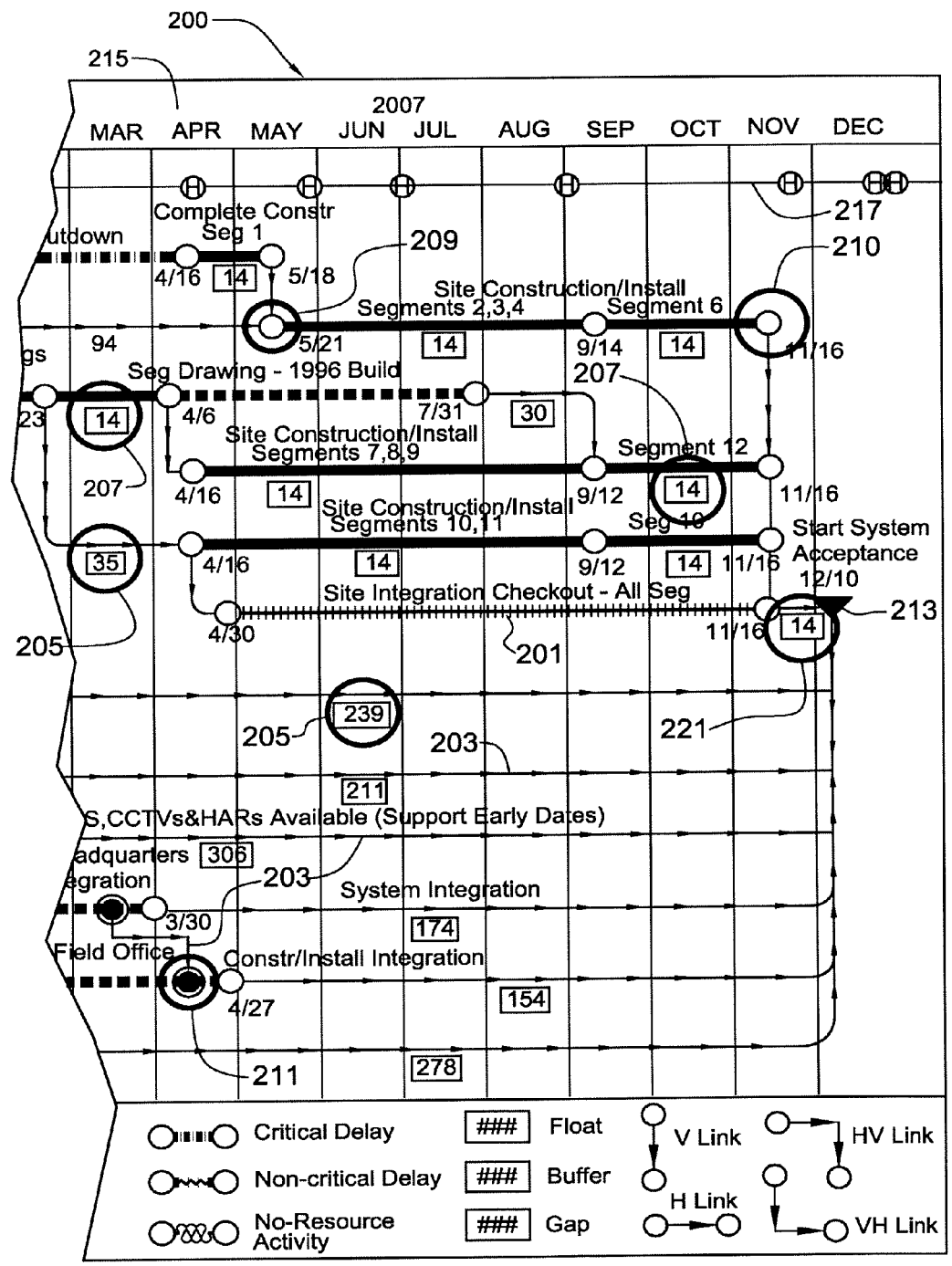
FIG. 2C shows an enlarged depiction of the left half of the sample project schedule of FIG. 2A.

Referring to FIG. 1, a summary diagram illustrating the interactive planning and scheduling method provided by Interactive Graphics-Based Planning System 100 according to a preferred embodiment of the present invention, and referring to FIG. 2A, FIG. 2B, and FIG. 2C, a sample project schedule created through the use of the interactive planning and scheduling method provided by the Interactive Graphics-Based Planning System 100 according to a preferred embodiment of the present invention: Interactive Graphics-Based Planning System 100 was developed to make planning and scheduling an intuitive process for the user. The system is preferably designed to suit itself to a users' own heuristics and thought process developed through years of collective experience (which is not contingent on experience with conventional network-based planning and scheduling).

Graphics-Based Planning System 100 preferably relies on graphics technology where the visual display of diagramming objects (depicting the evolving schedule) is an intrinsic part of planning. The technology is preferably comprised of an event-driven Graphical User Interface 120 with multi-document capability and GPM (see glossary) algorithms and rules processors. Preferably, all work by Project Planner 102 is done on Time-Scaled Calendar 200 that is preferably displayed on Computer Monitor 103 of Computer 105. Project Planner 102 may simultaneously plan and schedule a project using an intuitive Graphical User Interface 120 implemented within Graphics-Based Planning System 100, as shown. Graphical User Interface 120 preferably comprises a plurality of interface tools, including menus, dialog boxes, toolbars, as described below.

It is again emphasized that Interactive Graphics-Based Planning System 100 preferably comprises a visual, planning-centric process for network-based planning and scheduling. Preferably, planning on Time-Scaled Calendar 200, as opposed to schematically is more efficient and allows planning to evolve spontaneously rather than sequentially. Preferably, for the same reason, planning may switch from working forward from release dates to backwards from target dates or milestones, and vice versa.

Preferably, in Project Planning Process 107, Project Planner 102 iteratively completes a variety of steps to plan and schedule Project Plan 111. Simultaneously, as changes and additions are made to Project Plan 111, Computer 105 completes a variety of calculations as using Project Planning System 109, the results of which are displayed on Computer Monitor 103. Thus, Project Planner 102 may complete Project Plan 111 interactively, fully controlling both the planning and scheduling, including determining activity duration and activity relationship ties (logic ties). Preferably, Interactive Graphics-Based Planning System 100 enables the generation of Project Plan 111 in a time scaled, collaborative, graphical, planning environment, preferably allowing a project planner with limited scheduling training to simultaneously and collaboratively plan and schedule a project.

By design preference, the steps used to generate Project Plan 111 may be completed in any order by Project Planner 102. Preferred steps include: identifying project activities (Activity 201), represented by dimension lines, preferably with or without, arrowheads, and placing them on Time-Scaled Calendar 200, setting the duration for each Activity 201 (as represented by the length of the line representing Activity 201), identifying and placing Milestone 213, preferably with or without deadlines, on Time-Scaled Calendar 200 and defining relationship ties (dependency relationships), as shown by Link 203, between two or more Activities 201 or between one or more Activities 201 and Milestone Deadline 213. It is noted that the development of Project Plan 111 may preferably comprise additional steps to enable the management of supplementary planning processes, such as, for example, Resource Optimization, Cost Optimization, and Schedule Risk, as further described below.

Preferably, Project Planning System 109 permits at least twelve combinations of relationship ties, connect Activities 201, and Milestone Deadlines 213. In principle, predecessor Activity 201 has three possible connect points, that is: Start Node ("I" node 209); Embedded Node 211; and Finish Node ("J" node 210). Preferably, any of them can connect to three connection points for successor Activity 201, that is: Start Node ("I" node 209); Embedded Node 211; and Finish Node ("J" node 210); and also to one connection point to Milestone Deadline 213. Therefore, the preferred twelve combinations are:

1. Predecessor Activity Start Node ("I" node 209) to Successor Activity Start Node ("I" node 209) It is noted that interdependent Start and Finish Nodes are graphically conveyed as shared (superimposed) nodes;
2. Predecessor Activity Start Node ("I" node 209) to Successor Activity Finish Node ("J" node 210);
3. Predecessor Activity Start Node ("I" node 209) to Successor Activity Embedded Node 211;
4. Predecessor Activity Embedded Node 211 to Successor Activity Embedded Node 211;
5. Predecessor Activity Embedded Node 211 to Successor Activity Start Node ("I" node 209);
6. Predecessor Activity Embedded Node 211 to Successor Activity Finish Node ("J" node 210);
7. Predecessor Activity Finish Node ("J" node 210) to Successor Activity Start Node ("I" node 209);
8. Predecessor Activity Finish Node ("J" node 210) to Successor Activity Finish Node "J" node 210);
9. Predecessor Activity Finish Node ("J" node 210) to Successor Activity Embedded Node ("E" Node 211);
10. Predecessor Activity Start Node ("I" node 209) to Milestone Deadline 213;
11. Predecessor Activity Finish Node ("J" node 210) to Milestone Deadline 213; and
12. Predecessor Activity Embedded Node 211 to Milestone Deadline 213.

As noted, when Project Planning System 109 (operationally enabled on Computer 105) detects a change of any kind to Project Plan 111, Project Planning System 109 executes one or more computational and display steps comprising: calculating and displaying Relationship Float (also sometimes herein referred to as Logic Float or Gap); calculating and displaying Buffer Float (also sometimes herein referred to as Free Float or bFloat); calculating and displaying Activity Float (also sometimes herein referred to as Forward Float); and, if in lean planning mode, calculating and displaying Cut Float (also sometimes herein referred to as Controlled or Bound Float) and, if in the reverse mode, calculating and displaying Reverse Float (also sometimes herein referred to as Back Float). Thus, Project Planner 102 may preferably make changes in Activity 201 and/or Link 203 and/or Milestone 213 and receive immediate feedback from Project Planning System 109 which, in turn, permits Project Planner 102 to make adjustments to Project Plan 111 quickly and easily. Additionally, Project Planner 102 may work in the personally most effective sequence of steps to complete Project Plan 111 thereby effectively combining project planning and scheduling into a continuous process to yield Project Plan 111 in the shortest possible time. In addition, the preferred processes of Interactive Graphics-Based Planning System 100 enables users to make their own choices as to which project activities to move to earlier or later time frames, "crash" or extend to improve manpower loading and optimize time-dependent costs.

Figure 4:
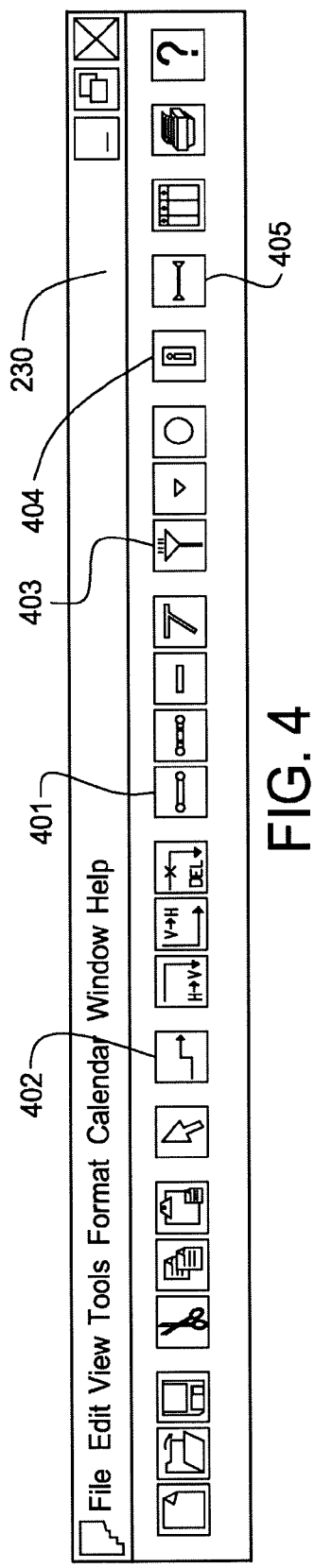
FIG. 4 shows an example Menu and Toolbar icons used to assist in preparing a project plan as used in the Interactive Graphics-Based Planning System according to a preferred embodiment of the present invention
Figure 5:
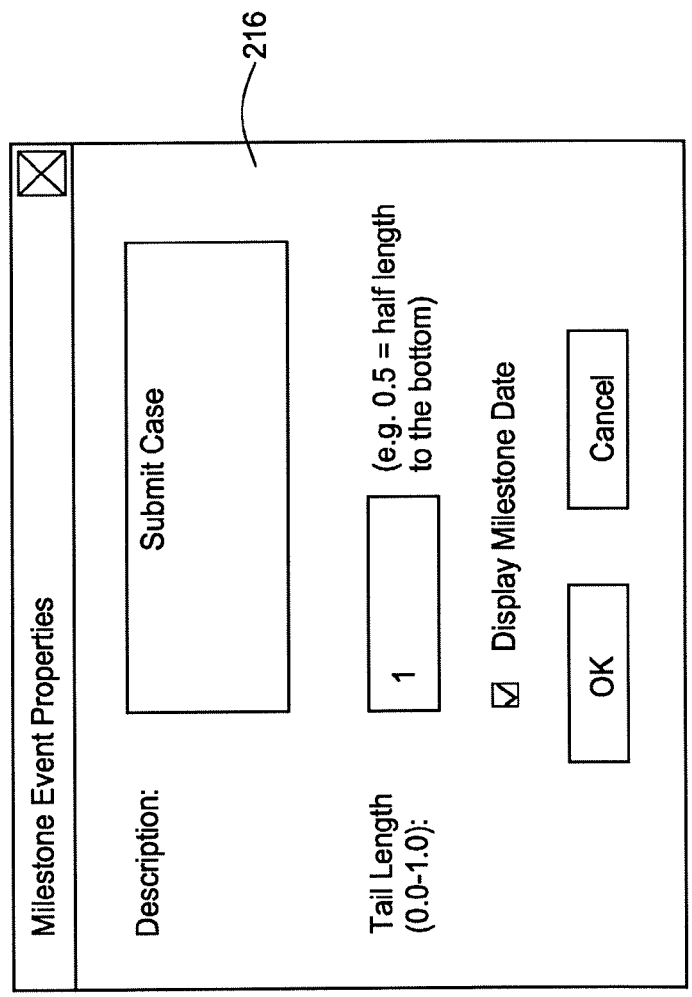
FIG. 5 shows an example Milestone Event Properties dialog box used to assist in identifying and placing milestone events on a Time-Scaled Calendar as used in the Interactive Graphics-Based Planning System according to a preferred embodiment of the present invention.
Figure 6:
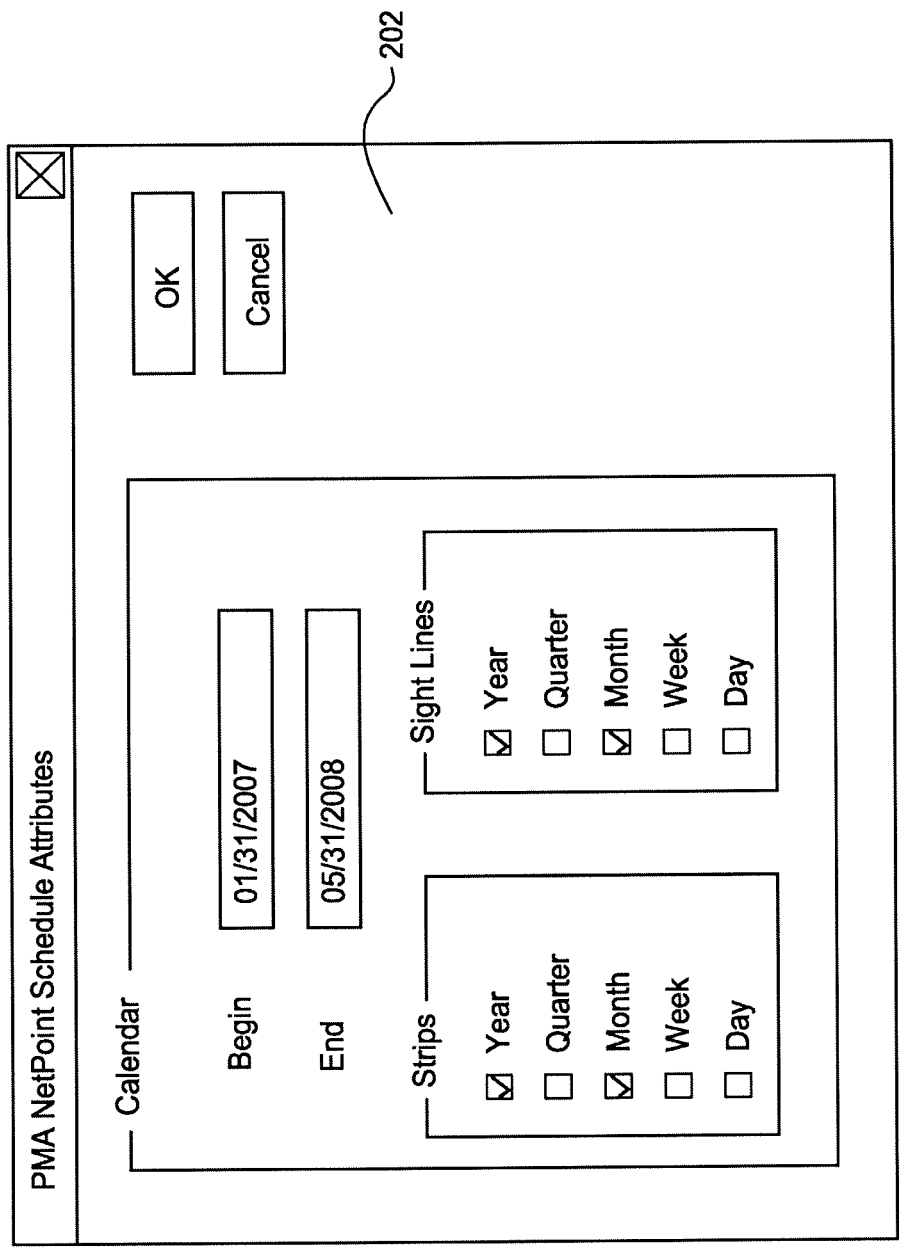
FIG. 6 shows an example Schedule Attributes dialog box used to assist in establishing a Time-Scaled Calendar as used in the Interactive Graphics-Based Planning System according to a preferred embodiment of the present invention.
Figure 7:
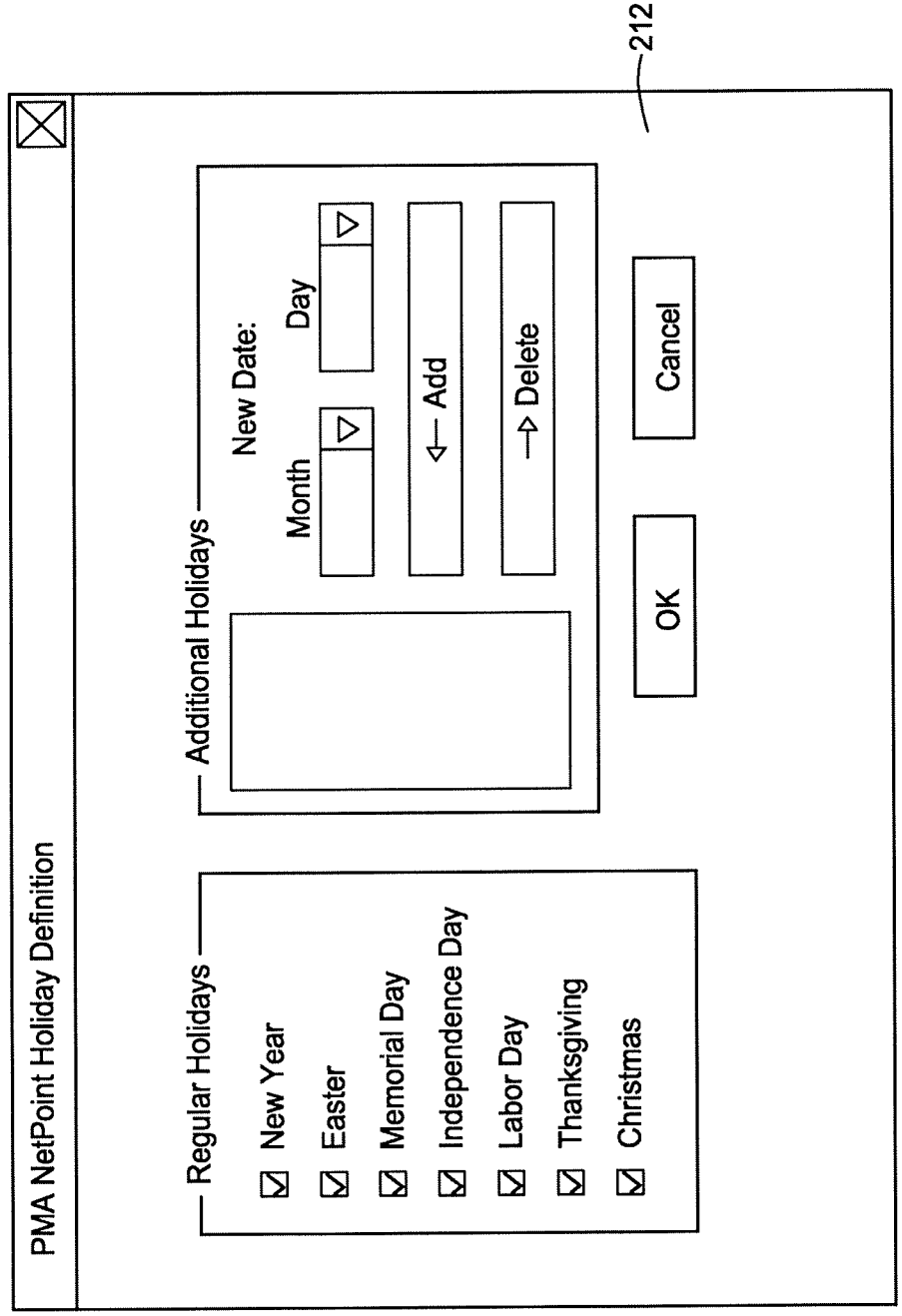
FIG. 7 shows an example Holiday Definition dialog box used to assist in establishing a Time-Scaled Calendar as used in the Interactive Graphics-Based Planning System according to a preferred embodiment of the present invention.

Illustrating a preferred embodiment: Project Planner 102 will first define Time-Scaled Calendar 200 preferably by using Schedule Attributes dialog box 202 as shown in FIG. 6 and Holiday Definition dialog box 212 as shown in FIG. 7. Once Time-Scaled Calendar 200 is established, Project Planner 102 may identify/define any number of tasks (also herein referred to as Activities) preferably in one of two ways. Project Planner 102 may preferably open Activity Properties dialog box 215, as shown in FIG. 3, to complete the information necessary to place Activity 201 on Time-Scaled Project Calendar 200. Alternately preferably, Project Planner 102 may place Activity 201 on Time-Scaled Calendar 200 by clicking Activity Icon Button 401 on tool bar 230 (as shown in FIG. 4) and then draw Activity 201 as a dimensioned line on Time-Scaled Calendar 200. Preferably, activities comprise an initial estimated duration. Similarly, Project Planner 102 may place Milestone 213 on Time-Scaled Calendar 200 in two ways, preferably either by opening Milestone Event Properties dialog box 216, as shown in FIG. 5, or alternately preferably, by clicking Milestone Icon Button 403 on the tool bar 230 (as shown in FIG. 4). Either method preferably enables the subsequent drawing of Milestone Deadline 213 on Time-Scaled Calendar 200. Preferably, Project Planner 102 may then establish Link 203 as relationship ties (also sometimes herein referred to as logic ties or dependency relationships) between two or more Activities 201. This is also preferably accomplished in one of two ways, preferably either by clicking Link Icon Button 402 on tool bar 230 (as shown in FIG. 4) and then drawing Link 203 on Time-Scaled Calendar 200 between predecessor and successor Activities 201 or, alternately preferably, by selecting "Link" from the menu and defining the type of relationship tie between predecessor and successor Activities 201. Preferably, Project Planner 102 may also establish Link 203 relationship ties between one or more Activities 201 and between one or more Activities 201 and Milestone Deadline 213. Preferably, the attachment point for Link 203 may be the start of Activity 201 ("I" node 209), the end of Activity 201 ("J" node 210) or at a particular point within the duration of Activity 201 (Embedded Node 211). Preferably, points of attachment for Link 203 with each respective Activity 201 are not lost if Project Planner 102 re-positions Activity 201 or modifies the duration of Activity 201. Preferably, relationship ties represented by Link 203 between Activity 201 and Milestone Deadline 213 are not lost if properties of Activity 201 or Milestone Deadline 213 are modified. Furthermore, the addition of new Activities 201, establishment of logic ties (relationship ties) between two or more Activities 201, shown as Link 203, between one or more Activities 201 and Milestone Deadline 213 may be completed in any sequence desired by Project Planner 102.

Figure 8:
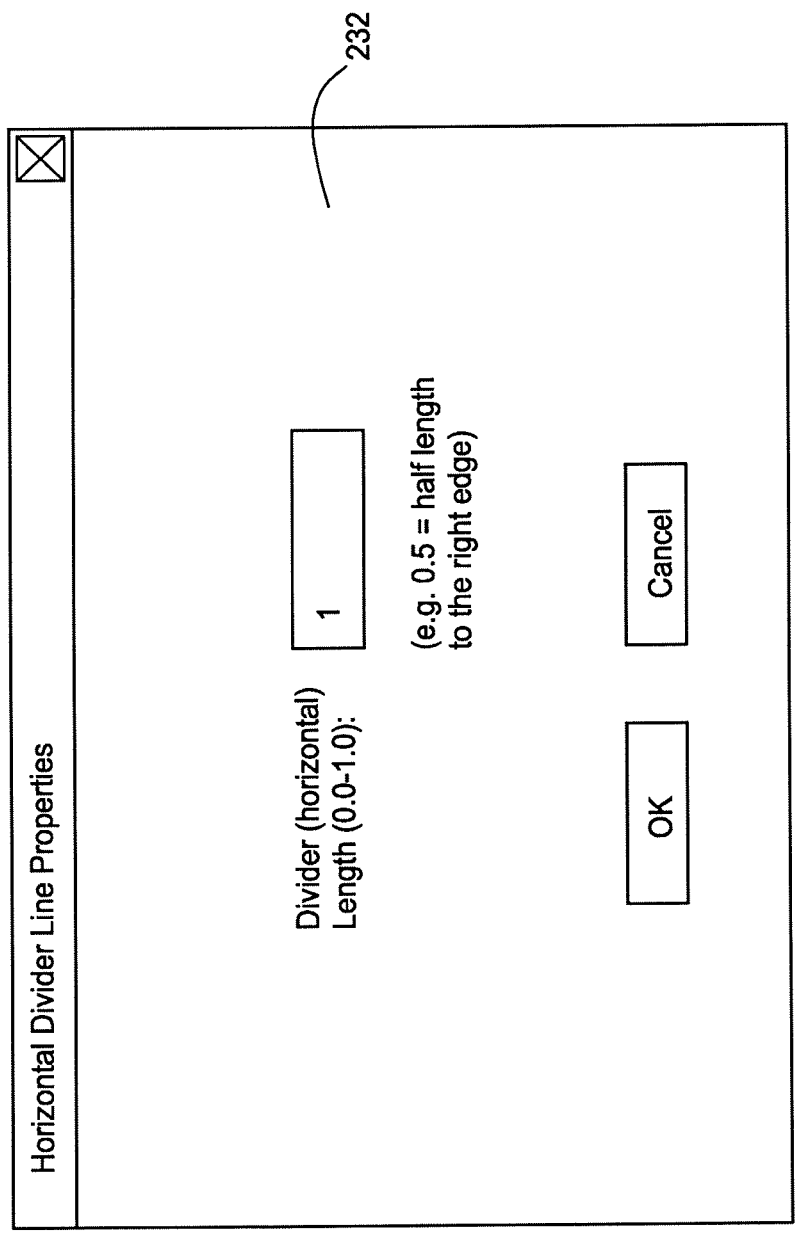
FIG. 8 shows an example Horizontal Divider Line Properties dialog box used to assist in establishing a Horizontal Divider Line on a Time-Scaled Calendar as used in the Interactive Graphics-Based Planning System according to a preferred embodiment used in the Interactive Graphics-Based Planning System according to a preferred embodiment of the present invention.
Figure 9:
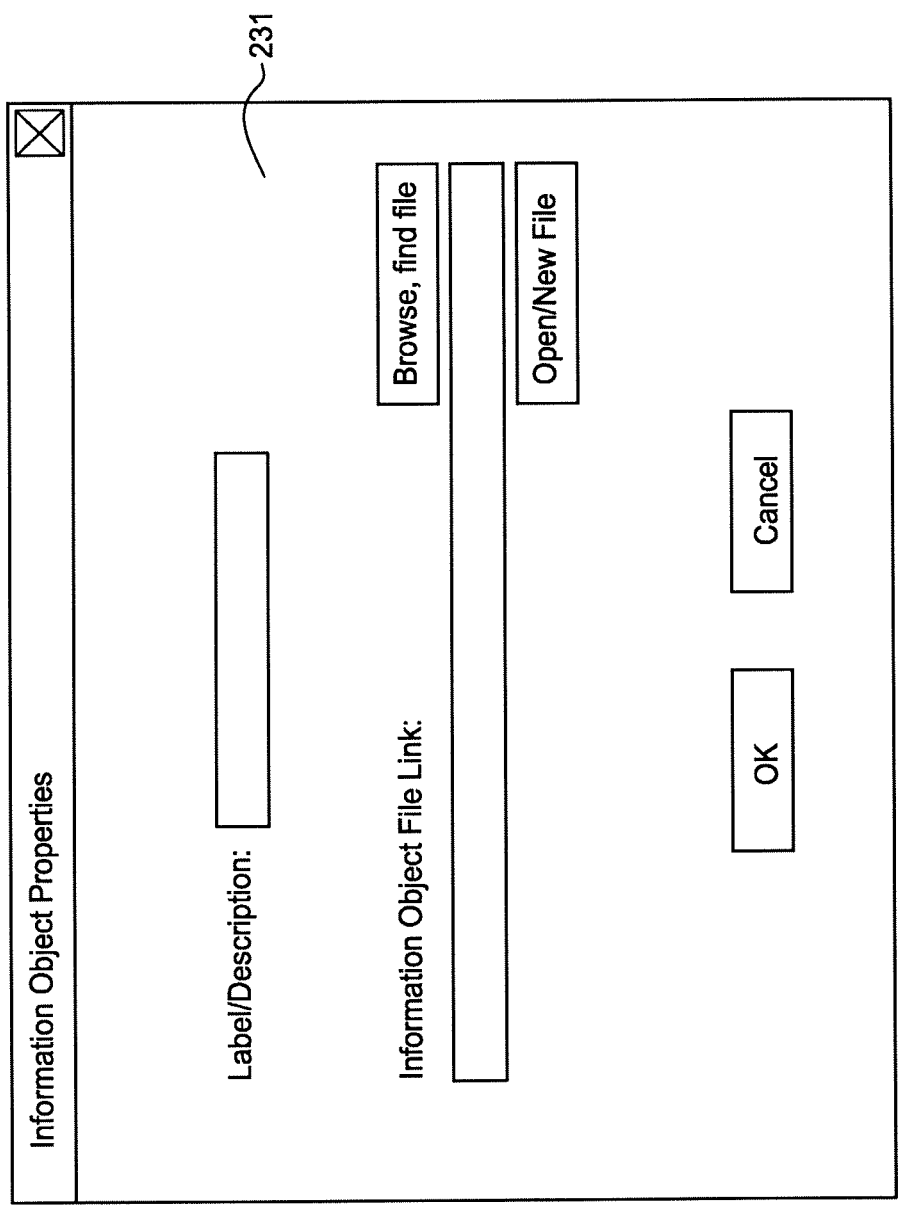
FIG. 9 shows an example Information Object Properties dialog box used to assist in placing a hypertext link to a document or URL on a Time-Scaled Calendar as used in the Interactive Graphics-Based Planning System according to a preferred embodiment of the present invention.

Referring again to FIG. 2A, FIG. 2B and FIG. 2C, preferably, Interactive Graphics-Based Planning System 100 presents key scheduling information utilized during Project Planning Process 107. Preferably, this scheduling information comprises Relationship Float 205 (depicting relationship ties between at least two Activities 201), either Activity-related float 207 (Activity Float in FIGS. 2A, 2B, 2C) and Relationship Float 221 (depicting relationship tie between Activity 201 and Milestone Deadline 213). Preferably, Activity-related Float 207 may display the results of a calculation of Activity Float (Forward Float) or Cut Float when Lean Planning calculation mode is selected in conjunction with forward-planning mode calculation. Preferably, Activity-related Float 207 may also display Reverse Float (Back Float) if Project Planner 102 selects backward-planning mode calculation (lean planning mode calculation is preferably not used in conjunction with backward planning mode calculation, for the sake of simplicity). For example, if Project Planner 102 prefers to view float values calculated from the end of the project, Activity Float (also sometimes herein referred to as Forward Float, a distantly analogous concept to total float in CPM) related to Activity 201 will be continuously calculated and displayed below Activity 201 as Activity Float 207. On the other hand, if Project Planner 102 prefers to view float calculated from the beginning of the project, i.e. in the backward-planning mode, Reverse Float (also sometimes herein referred to as Back Float) will be continuously calculated and displayed below Activity 201 as Total Float 207. Preferably, if lean planning mode calculation is selected in conjunction with forward planning mode calculation, Cut Float values (also sometimes herein referred to as Controlled or Bound Float) is continuously calculated and displayed below Activity 201 as Total Float 207 when relationship tie, represented by Link 203 between Activity 201 and Milestone 213, when Milestone 213, representing a Milestone Deadline, are defined. Preferably, Project Planner 102 may add hyperlinks to other documents or other information sources such as web sites using Information Object Properties dialog 231, as shown in FIG. 9. Preferably, the hypertext link is then displayed as Information Object 219. Preferably, Project Planner 102 may optionally add Horizontal Divider 223 (shown on FIG. 10 and FIG. 11 only for clarity) to assist in isolating related groups of Activities 201 by selecting Horizontal Divider Icon 405 (as shown in FIG. 4) and completing the Horizontal Divider Line Properties dialog box 232 as shown in FIG. 8. Preferably, Project Planner 102 may then graphically re-position Horizontal Divider 223 using the mouse or similar graphical pointing device of Computer 105.

Preferably, Relationship Float (also sometimes herein referred to as Buffer), displayed below Link 203 as Relationship Float 205, is calculated as the elapsed time between the start and end points of Link 203, which represents a time-dependent relationship between two or more activities within Project Plan 111. Preferably, Relationship Float 205 is calculated as $H_{i,j}=H_j-H_i$; for each "J", where "$H_j$" denotes the connection date to at least one successor activity "J" of a plurality of such successor activities and "$H_i$" denotes the connection date from at least one predecessor activity "I" of a plurality of such predecessor activities. For example, if the starting connection date of Link 203 is Jan. 20, 2007 and its ending connection date is Jan. 22, 2007 the Relationship Float is 2 days.

Preferably, Buffer Float (BF) is calculated as a function of Relationship Float (H), and the relationship is algorithmic where $BF_i=\min[H_{i,j}]$, for all "J", where "J" denotes each and every successor activity to the "I" Activity 201. Preferably, Buffer Float (BF), if turned on, is continuously calculated and displayed below Activity 201 as Buffer Float 207 when Project Planner 102 has chosen to show calculation of floats from the end of the project.

Preferably, Activity Float (AF) is calculated as a function of Relationship Float (H), and the relationship is algorithmic where $AF_i=\min[H_{i,j}+AF_j]$, for all "J", where "J" denotes each and every successor activity to the "I" Activity 201. Preferably, Activity Float (AF), if turned on, is continuously calculated and displayed below Activity 201 as Activity Float 207 when Project Planner 102 has chosen to show calculation of floats from the end of the project.

Preferably, Cut Float (CF), continuously calculated and displayed below Activity 201 as Cut Float 207, is an algorithmic calculation where $CF_i=\min[\min[H_{i,j}+AF_j], H_{i,m}]$, where $H_m$ denotes the link float between the "I" Activity 201 and a connected, "M" Milestone Deadline 213. Preferably, Cut Float values are only calculated and displayed if the user turns on the lean planning mode calculation. If not, then preferably Activity Float values are calculated with respect to the overall schedule completion date and displayed.

Preferably, Reverse Float (RF) is calculated as a function of Relationship Float (H) and the relationship is algorithmic where $RF_j=\min[RF_i+H_{i,j}]$, for all "I", where "I" denotes each and every predecessor activity to the "J" Activity 201. Preferably, Reverse Float (RF) is continuously calculated and displayed below Activity 201 as Reverse Float 207 when Project Planner 102 has chosen to show calculation of floats from the beginning of the project.

Upon reading the teachings of this specification, those with ordinary skill in the art will now understand that, under appropriate circumstances, considering such issues as advances in technology and user preference, etc., other methods of displaying Buffer Float, Activity Float, Cut Float and Reverse Float, such as side-by-side display of Activity Float and Reverse Float, or the use of mouse-over displays of Activity Float and Reverse Float or another display method, etc., may suffice.

Figure 10:
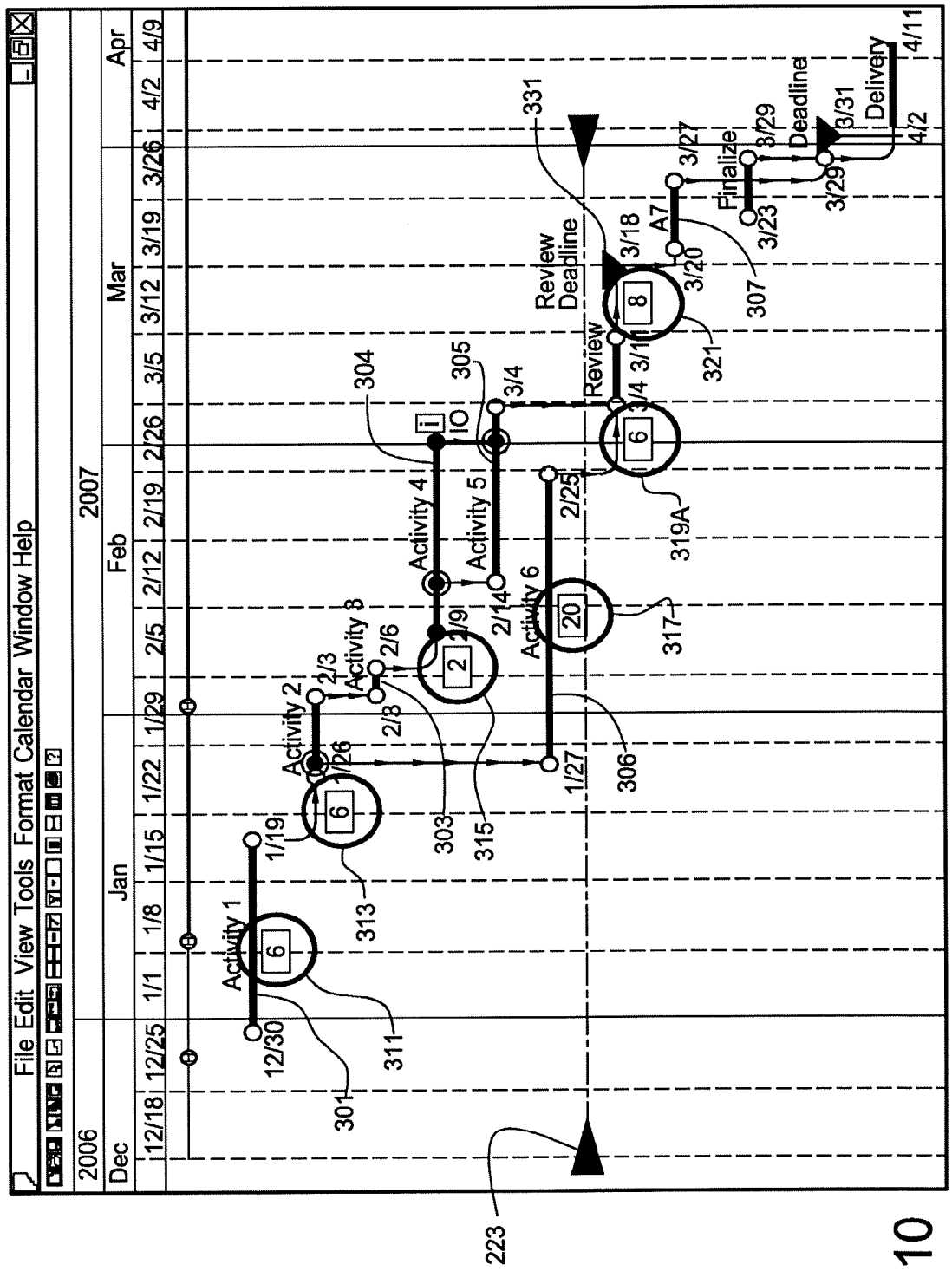
FIG. 10 shows a simplified sample project schedule created through the use of the interactive planning and scheduling method before re-positioning one or more activities provided by the Interactive Graphics-Based Planning System according to a preferred embodiment of the present invention.
Figure 11:
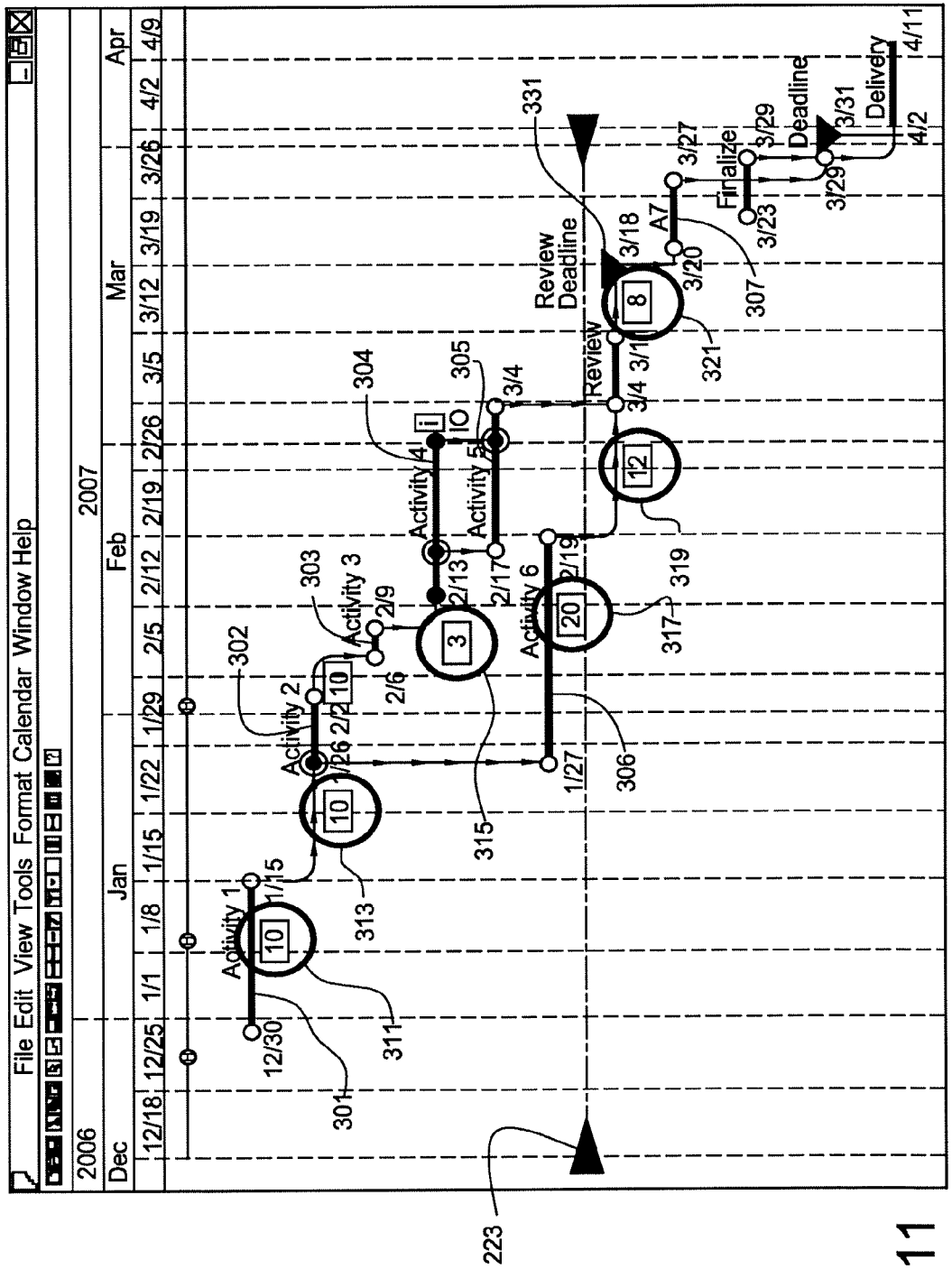
FIG. 11 shows a simplified sample project schedule created through the use of the interactive planning and scheduling method after re-positioning one or more activities provided by the Interactive Graphics-Based Planning System according to a preferred embodiment of the present invention.

Additionally, Project Planner 102 may preferably re-arrange Activities 201, adjust durations of Activities 201, move or adjust Milestone 213 and set up or remove Link 203 in any sequence desired by Project Planner 102, thus planning may proceed in a manner that is best suited to Project Planner 102. As changes are made to Project Plan 111 each value described above is re-calculated and the updated value displayed, which provides feedback to permit Project Planner 102 to determine the optimum schedule for Project Plan 111 without relying on complex and possibly disjointed steps or having substantial training and experience in the theory and practice of project planning. FIG. 10 and FIG. 11 illustrate examples of how changes made by Project Planner 102 are preferably presented. Preferably, Interactive Graphics-Based Planning System 100 permits the implementation of overlapping logic on otherwise non-overlapping ADM networking techniques through the use of Embedded Node 211 and Link 203 as a means for describing overlapping time-dependent relationships between Activities 201.

Preferably, Interactive Graphics-Based Planning System 100 permits Project Planner 102 to substitute ADM notation, or PDM notation for LDM notation by selecting the desired notation style from the Tools menu of Graphics-Based Planning System 100. It is noted that Interactive Graphics-Based Planning System 100 preferably utilizes attribute color to assist Project Planner 102 in differentiating graphical composition. Upon reading the teachings of this specification, those of ordinary skill in the art will now understand that, under appropriate circumstances, considering such issues as intended use, user preference, etc., other graphic arrangements, such as varying line types, etc., may suffice.

Referring again to FIG. 2A, FIG. 2B, and FIG. 2C, showing a sample project schedule created through the use of the interactive planning and scheduling method provided by the Interactive Graphics-Based Planning System 100 according to a preferred embodiment of the present invention, shown below are preferred attributes of:

1) Time-Scaled Calendar 200 Attributes (denotes icon, which pops dialogue box)

| | | |
|---|---|---|
| Calendar Beginning Date | Any date after 01 Jan. 1900 | Starts the time-scaled calendar |
| Calendar Ending Date | Any date after 01 Jan. 1900 | Fixes the end of the calendar |
| Strips (@ top of calendar) | Year/Quarter/Month/Week/Day | A sightline for each strip/time unit |

-continued

| | | |
|---|---|---|
| Optional Strips | Bottom and any chosen gridline | Point & Click or enter gridline # |
| Sightlines | Year/Quarter/Month/Week/Day | Heaviest for Y & Q; thinnest for Day |
| Non-Working, Holidays | Countries' menu; list legal holidays | Allow user to add and delete dates |
| Non-Working, Weekends | Fri, Sat or Sun may be non-working | Allow user to add back specific dates |
| Non-Working, Special Days | Specific day(s) or interval(s) | Strictly user-defined |
| Non-Working Day Line | Below strip, (H) or (N) (2> ea. date | Repeat for optional strips |
| Planning Mode | Forward Planning Forward/Lean Planning Backward Planning | Display aFloat or bFloat Calc & Display cFloat Calc & Display rFloat |

2) Activity 201 Attributes (denotes icon, which pops dialogue box)

| | | |
|---|---|---|
| Activity Description | Return key allows multiple rows | Once input, converts to text box |
| I-Node (LDM & ADM) | Automatic by clicking on LDM icon | Display date as user clicks/drags node |
| J-Node (LDM & ADM) | Automatic by clicking on LDM icon | Display date as user clicks/drags node |
| Planned Start Date (PSD) | Point & Click; input; or calculate | Place right of I-node; converts to text box |
| Planned Finish Date (PFD) | Point & Click; input; or calculate | Place left of J-node; converts to text box |
| Duration (DUR) | Input or calculate from start/finish | Calendar Days (CD) or Work Days (WD); show/lock value as user |
| Buffer Float (bFloat) | Calculate in Work Days (WD) or Calendar Days (CD) based on DURATION | Calculate as $BF_i = \min H_{i,j}$ |
| Activity Float (aFloat) | Calculate in Work Days (WD) or Calendar Days (CD) based on DURATION | Calculate as $AF_j = \min [H_{ij} + AF_j]$ |
| Cut Float (cFloat) | Calculate in Work Days (WD) or Calendar Days (CD) based on DURATION | Calculate as $CF_i = \min [\min[H_{i,j} + AF_j], H_i, m]$ |
| Reverse Float (rFloat) | Calculate in Work Days (WD) or Calendar Days (CD) based on | Calculate as $RF_j = \min [RF_i + H_{i,j}]$ |
| Activity Color Option | Forward Planning Mode | Red if aFloat < float threshold input value; Green if > float |
| | Backward Planning Mode | Red if rFloat < float threshold input value: Green if > float |
| Activity Node Paint Option | Blank, activity color or yellow | User selects option for selected nodes |
| Activity Input Display Options | Start date; finish date; duration | User selects attribute(s) to display |
| Float Display Options | aFloat or bFloat cFloat rFloat | Forward Planning Mode Forward/Lean Planning Mode Backward Planning Mode |
| Reset Start/Finish Dates | Fix start, calculate finish or vice versa | User option based on duration |
| Activity Gridline | Gridline on which activities are displayed | Calculate based on user's point & click |

3) Link 203 Attributes (denotes icon, which pops dialogue box)

| | | |
|---|---|---|
| Embedded Node or eNode(LDM) | Small yellow node between start & finish nodes | Show/lock date as user points/clicks |
| Relationship (Zero-Link Float) Ties | V (vertical only) | $H_{i,j} = H_j - H_i = 0$ |
| Relationship Float (Positive-Link Float) Ties | H, VH or HV, VHV | $H_{i,j} = H_j - H_i$ |
| Predecessor | Select link type and click | May be I-node or |

-continued

| | | |
|---|---|---|
| Node (I) | on I-node | embedded node |
| Successor Node (J) | Move cursor to J-node and click | May be J-node or embedded node |
| Relationship Float (Buffer) | Calculate in Work Days (WD) or Calendar Days (CD) as selected by User | Calculated as $H_{i,j} = H_j - H_i$: Placed in a box; converts to text box |

4) Milestone Deadlines 213 (Benchmark) Attributes (denotes icon, which pops dialogue box)

| | | |
|---|---|---|
| Conventional Milestone Benchmark, i.e., | Triangle with or without tail Hourglass, with | User sizes tail by point & click Must have logic tie |
| Zero-Float Milestone | or without tail | from an activity "I", "J" or "E" node |
| Activity to Benchmark Relationship Tie | H, V, VH or HV, VHV | Calc in Work Days (WD) or CD based on activity duration |
| Cut Float (cFloat) | Calculate in Work Days (WD) or Calendar Days (CD) based on Duration | $CF_i = \min [H_{i,j} + AF_j], H_i, m]$ |
| Floating Milestone | Green triangle; highlights anode | It moves with the node; no logic ties allowed |
| Milestone Description | Return key allows multiple rows | Once input, converts to text box |

-continued

| | | |
|---|---|---|
| Milestone Date | Point & Click; input; or calculate | Placed below right, convert to text box |
| Milestone Tail | Sized by input or point & click | Move to front, back or forward option |
| Milestone Duplicate(s) | Essentially copy & paste icon | Helpful for larger schedule plots |

5) Textural Elements (denotes icon, which pops dialogue box)

| | | |
|---|---|---|
| Text Box Icon | Point, drag, click on location | Return key allows multiple |
| Information Object Icon | Point, drag, click on location | Input hyperlink |
| Title Block | Text input by user | Return key allows multiple rows (4 max) |
| Title Block Activity Notation Legend | Click on red or green activity | Upon clicking, accept appropriate float value |

6) Special Features (denotes icon, which pops dialogue box)

| | | |
|---|---|---|
| Multiple Cloning | Repeat fragment by point & click | Refresh dates and floats; hold the rest |
| Schedule Grid | Dialogue box gives global spacing | Any gridline is moveable by point & click |
| Activity Color Threshold | Max displayed float value denoting red | If displayed float value is above threshold, green is used |
| Special Activities | Floating (muted green); dashed | No DUR or float for floating activities; only |
| PDM Activity Notation | Solid bar w/o nodes | All attributes are as for LDM notation |
| Restraints or Zero-Resource Activities | Orange bar, solid or dashed | Length set by clicking |
| Window Text Box | Start/finish date (left/right line); text | Blue long dashes; arrow bookends lines |
| Data Date Line | Draw line if input in title block | Allow custom width and style |
| Flashing Feature | Display floats and Relationship floats | Values that changed from prior cause |
| Font and Font Sizing | Default: Arial. Global size option | Any text box can be resized by user |
| Logic Tie Arrows | User controls how many on link | Default provided when link 1st drawn |
| Activity Duration Display | Color = bar color; below description | Once a text box, user can move at will |
| Activity-related Float Display | Below bar, in box color = bar color | Once a text box, user can move at will |
| Relationship (Logic) Tie Data Display | Relationship Float in blue box, centered | Once a text box, user can move at will |
| Lean Planning Option | If on, milestone relationship ties used | If off, milestone relationship ties ignored |
| Sightline Options | Global or individual customization | Width and style (like Word Border option) |
| Activity Bar & Node Option | Global or individual customization | Bar width and node diameter/bar width |
| Title Block Dates | Calculate Start Date and Finish Date | Data Date and Plot Date are input |

Referring to FIG. 10 (forward-planning mode, Activity Float turned on), which shows a simplified sample project schedule created through the use of the interactive planning and scheduling method before re-positioning one or more activities provided by the Interactive Graphics-Based Planning System 100 according to a preferred embodiment of the present invention, and FIG. 11 (forward-planning mode, Activity Float turned on), which shows a simplified sample project schedule created through the use of the interactive planning and scheduling method after re-positioning one or more activities provided by the Interactive Graphics-Based Planning System 100 according to a preferred embodiment of the present invention, a demonstration is provided illustrating how changes, by Project Planner 102, in activity duration, activity start date and end date changes results in automatic re-calculation and display, by Project Planning System 109, of Relationship Float 313, Relationship Float 315, Relationship Float 319, and Activity Float (or Reverse Float as selected by Project Planner 102) 311, Activity Float 317 (or Reverse Float as selected by Project Planner 102), and Relationship Float 321. On comparison of FIG. 10 and FIG. 11, it can be seen that project activities: First Activity 301, Second Activity 302, Third Activity 303, Fourth Activity 304, Fifth Activity 305, Sixth Activity 306, and Seventh Activity 307 have all been modified either as to duration and or start and end date by Project Planner 102. As a result of these changes, on comparison of FIG. 10 and FIG. 11, it is seen that:

Relationship Float 313 was originally 6 days, as shown on FIG. 10, has been as 10 recalculated as days as shown on FIG. 11;

Relationship Float 315 was originally 2 days, as shown on FIG. 10, has been re-calculated as 3 days as shown on FIG. 11;

Relationship Float 319 was originally 6 days, as shown on FIG. 10, has preferably been re-calculated as 12 days as shown on FIG. 11;

Activity Float 311 (or Reverse Float as selected by Project Planner 102) was originally 6 days, as shown on FIG. 10, has preferably been re-calculated as 10 days as shown on FIG. 11;

Activity Float 317 (or Reverse Float as selected by Project Planner 102) was originally 20 days, as shown on FIG. 10, has preferably been re-calculated and remains as 20 days as shown on FIG. 11; and Relationship Float 321 was originally 8 days, as shown on FIG. 10, and remains as 8 days as shown on FIG. 11.

Preferably, the impact of planning and scheduling decisions are immediately presented to Project Planner 102, which preferably enables rapid iterative development of Project Plan 111, as shown above. When Activities 201 are connected and dated in one step in full view of stakeholders, they can apply their collective judgment to select/re-select activity dates and prevent inadvertent error during planning. Thus, as the evolving schedule nears full development, Project Planner 102 and key stakeholders are able to resolve resource constraints, accomplish schedule recovery, look for optimal date scenarios, and otherwise quickly rework the initial draft plan, visually, without having to rely on the black box calculations performed by conventional scheduling methodologies.

In its simplest embodiments, Interactive Graphics-Based Planning System 100 allows stakeholders to collaboratively and intuitively drive a schedule toward a preconceived optimal duration, whether for the whole or any portion of the schedule, by spontaneously sliding activities back and forth, crashing or extending activities, or both, without any explicit consideration given to specific resource levels or time/cost tradeoffs. It is noted that Interactive Graphics-Based Planning System 100 does not limit the types of data that can be associated with an activity. From a functional standpoint, it is generally preferred that Interactive Graphics-Based Planning System 100 preferably include the simultaneous management of three central planning processes identified herein as Resource Optimization, Cost Optimization, and Schedule Risk. Preferably, such fundamental planning processes or functionalities, which heretofore could only be dealt with in batches, are managed essentially at the same time that activities are defined, connected, and repositioned within Time-Scaled Calendar 200. If resources and crashing costs are assigned to such activities, with each activity move, whether sliding back and forth, shortening or extending activities, there is immediate feedback on how resource profiles and/or costs are impacted. The preferred functional relationships of these planning processes, within Interactive Graphics-Based Planning System 100, are further described below.

Resource Optimization preferably occurs interactively within Project Plan 111. In preferred embodiments of Interactive Graphics-Based Planning System 100, provided resource units are preferably associated with project tasks/activities as such activities are added, deleted and/or repositioned on Time-Scaled Calendar 200. Interactive Graphics-Based Planning System 100 offers the unique functionality of continuously displaying the evolving resource profiles. In other words, if a hypothetical piping activity requires five or six pipe fitters, the evolving resource "histogram" for pipe fitters is easily revised to reflect five or six more pipe fitters for the days corresponding to the activity's positioning. In fact, as activities are positioned or repositioned, if the evolving resource profile starts to trend unfavorably, such trends can be reversed by simply repositioning the activity to a position that resolves the impasse. Preferably, Resource Optimization is calculated as $RES_n = RES_n + R_i$, where "n" denotes every day between the planned dates for activity "I" and "Ri" denotes the resource daily rate for activity "I".

If resources are associated with the activities, resource-limited activity dates and floats are preferably solidified as the plan evolves. In other words, Interactive Graphics-Based Planning System 100 is preferably structured and arranged such that resources can be displayed and leveled at the same time activities are positioned and interconnected on Time-Scaled Calendar 200. This is only possible owing to the concept of simultaneity as embodied within the preferred processes of Interactive Graphics-Based Planning System 100. The above-described resource optimization feature of Interactive Graphics-Based Planning System 100 at least embodies herein: associating at least one daily resource requirement, by such at least one project planner using such at least one computational device, with such at least one symbol representing each such activity of such at least two activities of such plurality of activities on such at least one time-scaled calendar on such at least one graphical user interface; re-positioning, by such at least one project planner using such at least one computational device, such at least one symbol representing each such activity of such at least two activities of such plurality of activities on such at least one time-scaled calendar on such at least one graphical user interface; re-calculating, by such at least one computational device, increment and daily resource requirements, for at least one distinct resource, relating to at least one such activity repositioning; and displaying, essentially continuously, by such at least one computational device, re-calculated daily resource requirement values on such at least one time-scaled calendar on such at least one graphical user interface.

Cost Optimization in preferred embodiments of Interactive Graphics-Based Planning System 100 is preferably handled in a similar interactive manner. Provided time-cost data is similarly associated with project tasks/activities, as such activities are added, deleted and/or repositioned on Time-Scaled Calendar 200. In the event the evolving plan breaches a milestone, preferably, Interactive Graphics-Based Planning System 100 offers the unique functionality of identifying all zero or small float activities that can be crashed or extended at optimal cost. Enabling such a comprehensive overview within Interactive Graphics-Based Planning System 100 greatly assists Project Planner 102 in selecting the order in which activities should be revised to optimize the project. Again, Interactive Graphics-Based Planning System 100 allows the evolving plan to be accelerated or relaxed, to adhere to deadlines (or to improve project pace) at the same time activities are positioned and interconnected on Time-Scaled Calendar 200. Again, this preferred system process is only possible owing to the concept of simultaneity as embodied within the preferred processes of Interactive Graphics-Based Planning System 100. The above-described cost optimization feature of Interactive Graphics-Based Planning System 100 at least embodies herein; associating time-cost data, by such at least one project planner using such at least one computational device, with such at least one symbol representing each such activity of such at least two activities of such plurality of activities on such at least one time-scaled calendar on such at least one graphical user interface; re-positioning, by such at least one project planner using such at least one computational device, such at least one symbol representing each such activity of such at least two activities of such plurality of activities on such at least one time-scaled calendar on such at least one graphical user interface; re-calculating, by such at least one computational device, such time-cost data, relating to at least one such activity repositioning, to provide at least one re-calculated time-cost profile; and displaying, essentially continuously, by such at least one computational device, such at least one re-calculated time-cost profile on such at least one time-scaled calendar on such at least one graphical user interface.

In managing Schedule Risk, provided duration probability distribution functions are, in a similar manner, preferably associated with project task/activities, as activities are added, deleted and/or repositioned on Time-Scaled Calendar 200. Through Monte Carlo simulation techniques, iterating many times through the plan, Interactive Graphics-Based Planning System 100, preferably calculates the corresponding probability distribution function for the plan overall completion, as well as to what extent the activities turned out as having zero float (commonly referred to as activity criticality indexes). Using this highly preferred feature of Interactive Graphics-Based Planning System 100 allows the evolving plan to be risked at any time, further allowing the project to be "reworked" to attain a better risk profile. The above-described cost optimization feature of Interactive Graphics-Based Planning System 100 at least embodies herein; associating duration probability distribution functions, by such at least one project planner using such at least one computational device, with such at least one symbol representing each such activity of such at least two activities of such plurality of activities on such at least one time-scaled calendar on such at least one graphical user interface; re-positioning, by such at least one project planner using such at least one computational device, such at least one symbol representing each such activity of such at least two activities of such plurality of activities on such at least one time-scaled calendar on such at least one graphical user interface; re-calculating, by such at least one computational device, such duration probability distribution functions, relating to at least one such activity repositioning, to provide at least one project risk profile; and displaying, essentially continuously, by such at least one computational device, such at least one project risk profile on such at least one time-scaled calendar on such at least one graphical user interface.

Interactive Graphics-Based Planning System 100 preferably provides a process that, except for the initial calculation of link gaps, activity buffers, and floats concedes to human judgment in all respects, including the determination of activity early dates. Rather than relying on heuristics that few can use or understand, Interactive Graphics-Based Planning System 100 lets users make intelligent choices as to which activity(ies) to tackle first, i.e., moving to later timeframes and/or crashing/extending durations to improve manpower loading and/or shorten/extend the schedule. To put it in other words, Interactive Graphics-Based Planning System 100 "adapts" itself to the users' own heuristics, developed through their many years of experience with or without CPM. Unlike CPM, which provides algorithms for calculating early/late dates, floats and schedule optimization, Interactive Graphics-Based Planning System 100 preferably provides only float algorithms and allows the user to heuristically configure the schedule in all other respects. Thus, the "one-step" scheme embodied within Interactive Graphics-Based Planning System 100 contrasts sharply with the conventional CPM "mental world" of hatching (including such conventional variants as critical chain and lean construction phase scheduling). Thus, those skilled in the art will now appreciate that Interactive Graphics-Based Planning System 100 preferably advances network-based planning and scheduling to the point where attention can now focus on improving resource profiles and optimizing critical activities.

Preferably, Interactive Graphics-Based Planning System 100 supports close working collaborations between multiple project stakeholders, who may preferably form working groups during the development of Project Plan 111. Preferably, Project Planning System 109 includes facilities to keep track of the network of project activities based on the user interaction and provides users with a networks schedule. It is noted that Project Plan 111 may preferably comprise a network schedule with or without resource/cost optimization components. Upon reading the teachings of this specification, those of ordinary skill in the art will now understand that, under appropriate circumstances, considering such issues as user preference, intended use, etc., other system features, such as providing to such at least one project planner, using such at least one computational device, computational support of: project activity resources, project activity cost loading, project resource-constrained scheduling, project multi-unit scheduling, project time-cost tradeoffs, project schedule hammocking, as-planned/as-built schedule analysis, etc., may suffice.

Figure 12:
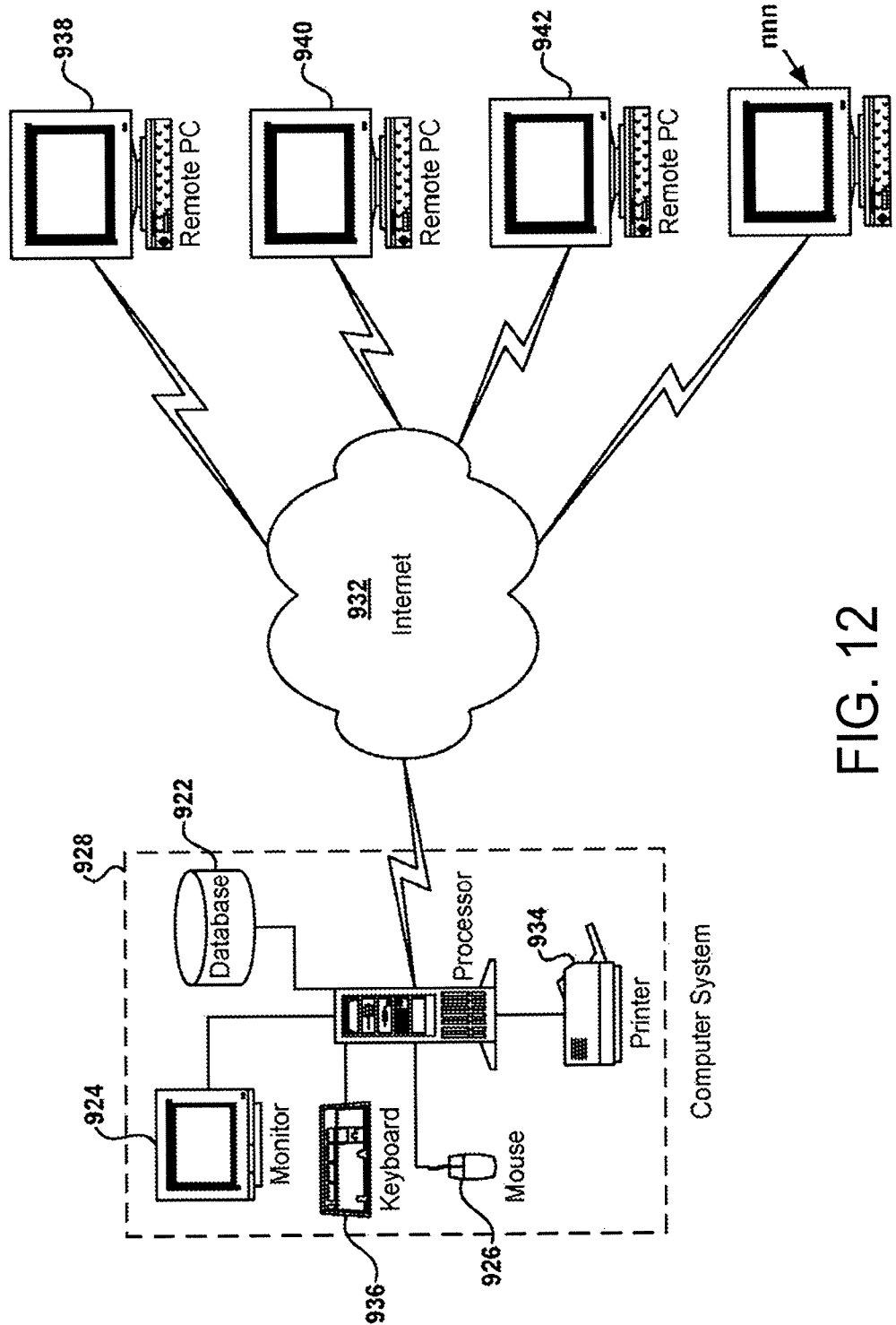
FIG. 12 shows an overview schematic representation of the computer hardware and Internet environment utilized by the Interactive Graphics-Based Planning System according to a preferred embodiment of the present invention.

Referring to FIG. 12, an overview schematic representation of the computer hardware and Internet environment utilized by the Interactive Graphics-Based Planning System 100 according to a preferred embodiment of the present invention is shown. The computer hardware environment comprises Computer System 928, and, in turn, Computer System 928 comprises input and output devices as is well known in the art. For example, Computer System 928 preferably comprises a display screen or Monitor 924, Keyboard 936, Printer 934, Mouse 926, etc. Computer System 928 further preferably comprises Database 922 for storage of the data and software comprising preferred embodiments of the present invention. Computer System 928 is preferably connected to Internet 932 which serves as a preferred communications medium. Internet 932, as previously discussed, comprises a global network connecting local and regional networks and computers, public and private. The Internet 932 is the preferable connection method by Remote PC 938, Remote PC 940, Remote PC 942 and Remote PC nnn to Computer System 928 in some preferred embodiments of the present invention.

Figure 13:
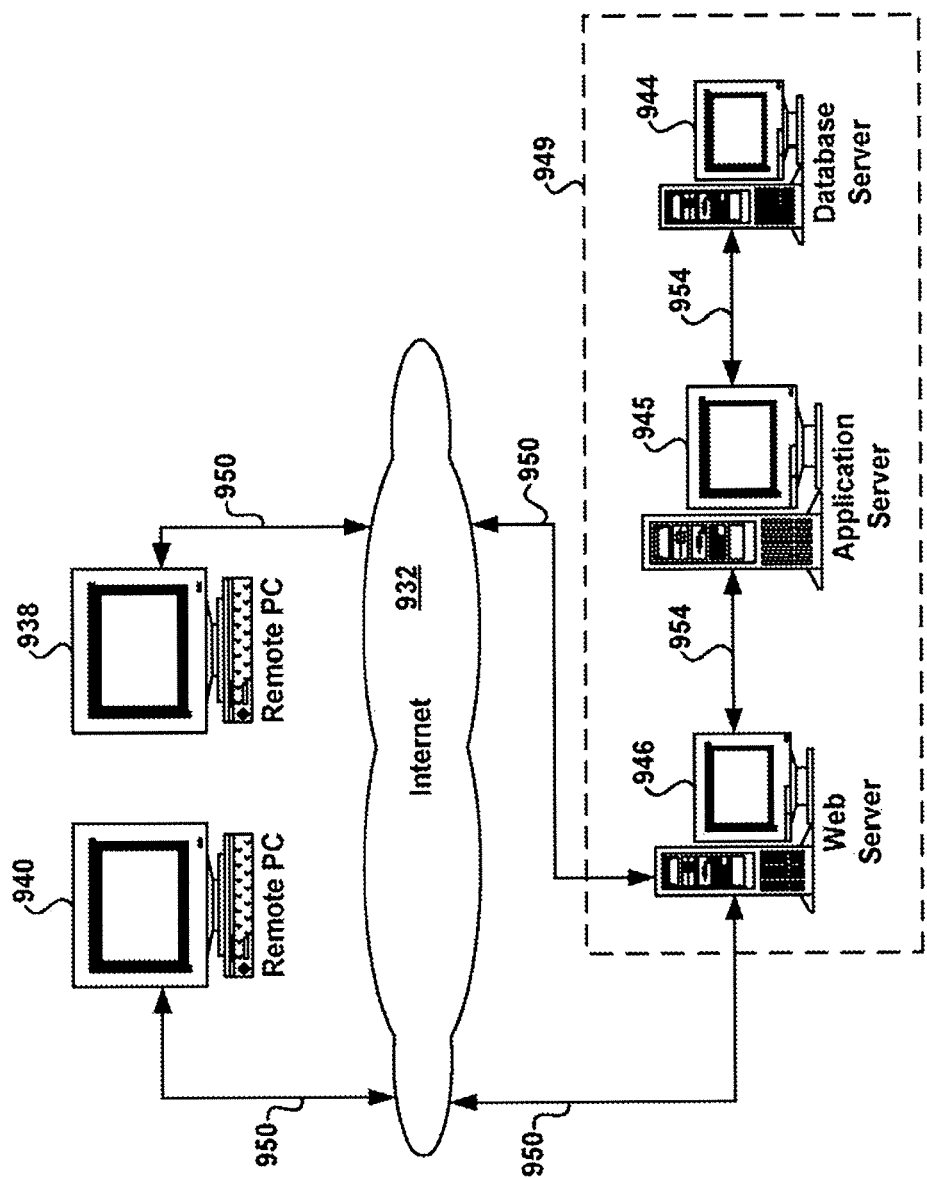
FIG. 13 shows a simplified functional diagram illustrating a preferred web server implementation for Internet-based operation of the Interactive Graphics-Based Planning System according to a preferred embodiment of the present invention.

Referring to FIG. 13 a simplified functional diagram illustrating a preferred web server implementation for operating the Interactive Graphics-Based Planning System 100 according to a preferred embodiment of the present invention is shown. This figure shows the preferred relationships between Remote PC 938 (as an example of any number of Remote PC 940, Remote PC 942, Remote PC nnn), Internet 932, Web Server 946, Application Server 945 and Database server 944. As shown, a Remote PC 938 requests a page from the Project Planning Web Site 949 where a preferred embodiment of the present invention is preferably located. Remote PC 938 is preferably connected via Internet 932 to Web Server 946, which receives the web page request and initiates a call to Application Server 945. A preferred embodiment of the present invention installed on Application Server 945 then makes at least one request to Database Server 944 and generates an HTML page for transmission to Remote PC 938 following completion of the present invention's request and transmission of the requested data back to the Application Server 945 by Database Server 944. Web Server 946 then transmits the completed HTML page containing the data requested by Remote PC 938 through Internet 932 to Remote PC 938. Connection 954 is typically a TCP-IP connection, or other connection which permits communication between Application Server 945 and Database Server 944 and between Application Server 945 and Web Server 946. Connection 950 is typically TCP-IP and permits Remote PC 938 and Remote PC 940 to communicate with Web Server 946.

Preferably, application logic is divided into components according to function; and the various application components are installed on different machines depending on the tier on which the application component belongs:

1. Preferably, client-tier components run on a client machine.

2. Preferably, web-tier components and business-tier components run on a web server and an application server. (As noted the web-tier and business-tier components may both be run on a single server which acts as both a web server and an application server.)

3. Preferably, enterprise information system tier components run on the database server. Although a web application can consist of three or four tiers, multi-tiered applications are generally three-tiered applications because they are distributed over different locations: client machines, the application server machine, and the database machines at the back end. Three-tiered applications that run in this way extend the standard two-tiered client/server model by placing a multi-threaded application server between the client application and back-end storage server.

Figure 14:
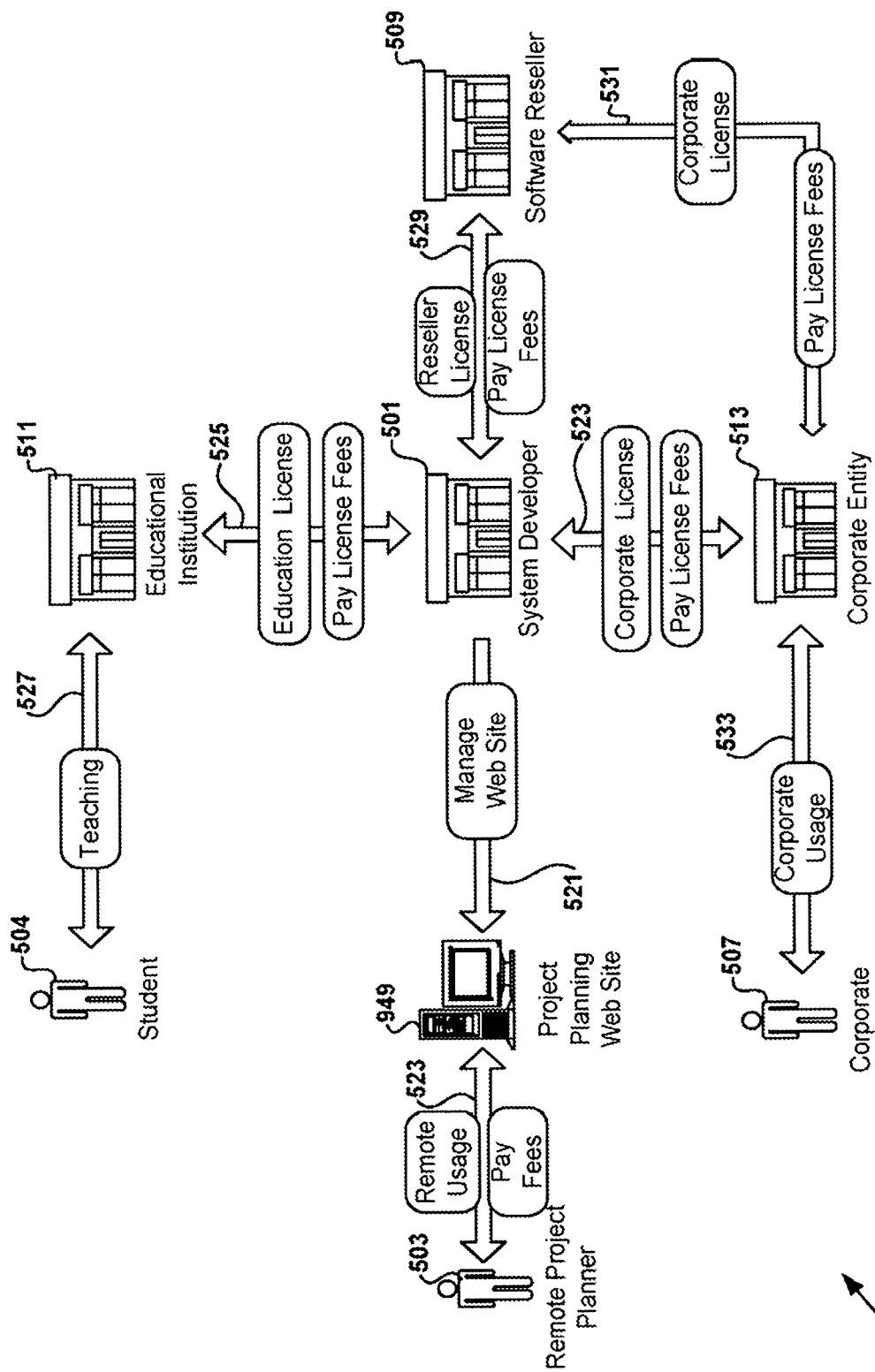
FIG. 14 shows a simplified schematic illustration of the preferred business method relating to the licensing, implementation and use of the Interactive Graphics-Based Planning System according to a preferred embodiment of the present invention.

Referring to FIG. 14, showing a simplified schematic illustration of the preferred Business Method 500 relating to the licensing, implementation and use of the Interactive Graphics-Based Planning System 100 according to a preferred embodiment of the present invention, preferably System Developer 501 will develop Project Planning System 109 and offer Project Planning System 109 for licensed usage in several methods. (Refer to FIG. 15) As shown, preferably System Developer 501 will develop and operate Project Planning Web Site 949, as shown in Manage Web Site Process 521, which will preferably permit Remote Project Planner 503 to develop and save Project Plan 111. Preferably, System Developer 501 will require Remote Project Planner 503 to agree to a usage license and to pay for usage of Project Planning System 109 preferably on the basis of the number of Activities 201 contained within Project Plan 111 prepared by Remote Project Planner 503 as shown in Remote Usage Process 523. In other words, Remote Project Planner 503 will pay a set amount for each Activity 201 contained in Project Plan 111. Thus, Project Planning System 109 will preferably be available to inexperienced individuals to assist in completing Project Plan 111 with limited or no assistance of project planning and scheduling experts. Upon reading the teachings of this specification, those with ordinary skill in the art will now understand that, under appropriate circumstances, considering such issues as advances in technology, user preference, competitive requirements, user location, etc., other methods of license fee calculation, such as a monthly fee, one-time payment, etc., may suffice.

Referring again to FIG. 14, as shown by Education License Process 525, System Developer 501 will preferably offer Project Planning System 109 to Educational Institution 511 for use in classroom-based teaching of project planning and scheduling concepts and methods. Preferably, Educational Institution 511 will use Project Planning System 109 to teach Student 504 project planning and scheduling concepts as shown in Teaching Process 527. Preferably, System Developer 501 will receive license fee payments in return for licensing use of Project Planning System 109 as shown by Education License Process 525. Upon reading the teachings of this specification, those with ordinary skill in the art will now understand that, under appropriate circumstances, considering such issues as advances in technology, user preference, competitive requirements, user location, etc., other license fee arrangements, such as a license fee waiver, substantially reduced license fees, etc., may suffice.

Referring once more to FIG. 14, as shown by Corporate License Process 523, System Developer 501 will preferably offer Project Planning System 109 to Corporate Entity 513 for use by Corporate Project Planner 507. Preferably, Corporate Entity 513 will complete a license agreement to permit usage within mutually agreed limitations by Corporate Project Planner 507 in return for payment of mutually agreed license fee. Preferably, as shown in Corporate Usage Process 533, Corporate Project Planner 507 may use Project Planning System 109 implemented on standalone computer systems such as personal computers, implemented on local area networks or implemented on a corporate intranet as preferred by Corporate Entity 503. Preferably, System Developer 501 will receive license fee payments in return for licensing use of Project Planning System 109 to Corporate Entity 513, as shown by Corporate License Process 523. As used herein, Corporate Entity 503 represents any form or business entity which is for-profit or not-for-profit, or any governmental entity.

Referring once more to FIG. 14, as shown by Reseller License Process 529, System Developer 501 will preferably offer Project Planning System 109 to Software Reseller 509. Preferably, the licensing agreement will permit Software Reseller 509 to make copies of Project Planning System 109 and offer licensed copies of Project Planning System 109 to Corporate Entity 513. Preferably, System Developer 501 will receive a mutually license fee calculated on a mutually agreed basis for permitting Software Reseller 509 to copy and re-license Project Planning System 109 to Corporate Entity 513 as part of Re-licensing Process 531. As shown, Software Reseller 509 will then offer license Project Planning System 109 to Corporate Entity 513 in return for an agreed license fee as shown in Re-licensing Process 531.

Upon reading the teachings of this specification, those with ordinary skill in the art will now understand that, under appropriate circumstances, considering such issues as advances in technology, user preferences, competitive requirements, user locations, etc., other business methods, such as licensing project planning system to individuals for local implementation, licensing project planning system to corporate entities for Internet-based use, etc., may suffice.

Figure 15:
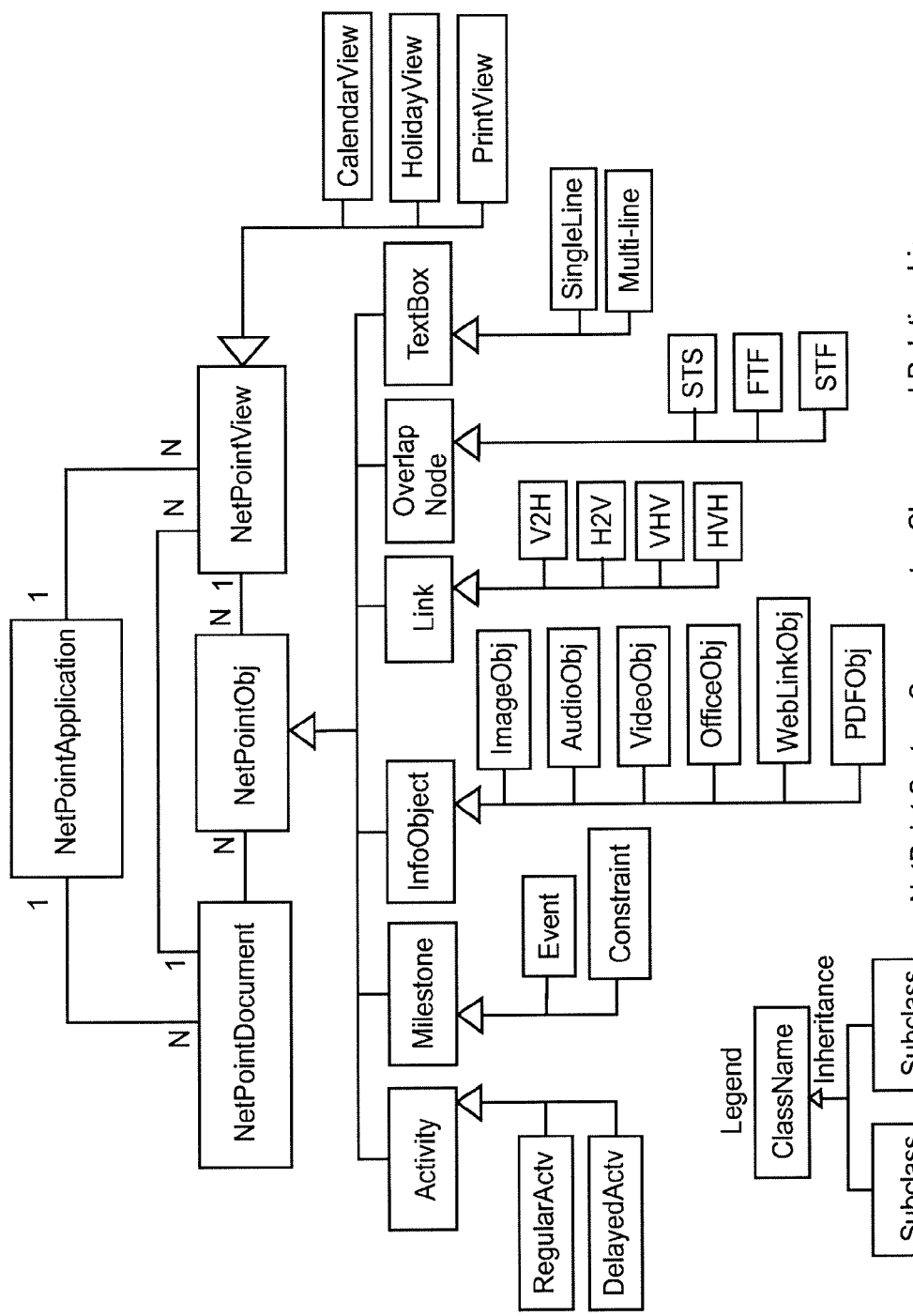
FIG. 15 shows a diagram illustrating preferred software details of Applicant's commercial embodiments of the present invention.

FIG. 15 shows NetPoint· system is Applicant's commercial implementation of Interactive Graphics-Based Planning System 100. NetPoint™ system design is preferably based on object-oriented programming. Preferably, using C++ programming language, NetPoint™ defines Classes (major components of software architecture) that support a wide variety of functions including input, output, data storage, data calculation, and graphical display of activities, logic ties and milestones combining to a plan and schedule. The preferred hierarchical structure of the classes allows for generalization and inheritance of operational functions and attributes. The preferred relationships among the classes define how these software components communicate with one another by passing and receiving data. The preferred encapsulation of data and operational functions enables the system design to be modular, reusable, and extendable in terms of software maintainability. The compiled (executable) version of the NetPoint™ system is preferably a standard Microsoft Windows application, which is based on an event-driven graphical user interface (GUI) with multi-document capability. Upon reading the teachings of this specification, those of ordinary skill in the art will now understand that, under appropriate circumstances, considering such issues as intended use, advances in software, etc., other programming arrangements, such as implementations within the Linux Operating System, Mac OS X, etc., may suffice. Low-level functions and system input/output are preferably provided through Windows' physical layer interface and software drivers. NetPoint™ preferably builds on top of the basic classes from Microsoft Windows standard libraries and Microsoft Foundation Classes (MFC). Additional classes are preferably defined to provide the unique features to model and process Applicant's novel LDM notation (Logic Diagram Method), the preferred activity-diagramming environment that integrates traditional ADM and PDM project networking techniques.

As to LDM features, NetPoint™ preferably contains specialized graphical objects that preferably depict characteristics of a project plan. These graphical objects preferably include activities; logic ties/links; at least two types of milestones; embedded nodes (through which start-to-start, finish-to-finish, start-to-finish logic can be modeled); link arrows denoting direction; calendar graphics, including non-working day lines; textboxes; and information objects. Collectively, these objects preferably allow the user to simultaneously create project plans and schedules intuitively, simply and efficiently. In contrast to conventional CPM (critical path method) software systems, where the graphical display is a post processor of data stored in a separate database structure, NetPoint™ is preferably designed as a graphic-centric system where the graphical display is preferably an intrinsic part of project planning components, such as activities, links and milestones. For example, activities preferably contain their own unique drawing functions for graphical display and data manipulations, such as calculating start and finish dates, activity durations, activity and link floats (whether based on calendar days or working days as specified by the user).

NetPoint™ system preferably derives from Applicant's Graphical Planning Method (GPM) a preferred embodiment of Interactive Graphics-Based Planning System 100. In addition to planning and scheduling project activities, GPM algorithms and rules preferably support program and decision review by project participants and executives with easily understandable graphical representations. Preferably, GPM can also facilitate modeling business process with direct reference to timeline, resources, and sequences. With proper hardware and software configuration, NetPoint's GPM can preferably support full-wall planning and collaboration sessions for mission critical projects where multiple and distributed project participants (stakeholders) can simultaneously collaborate to resolve project issues efficiently and effectively.

The following sections describe the preferred core Net-Point™ classes and their relationships (See the diagram of FIG. 15). Each Class is depicted in a rectangle with their Class name. Common attributes and operations are preferably organized in a hierarchical structure so that sub-Classes can inherit attributes and operational functions from their parent Classes. The 1:1, 1:N, N:1 notations describe the one-to-one, one-to-many, and many-to-one relationships in addition to message and data passing among Class objects, as shown below.

1. NetPointApplication

Class Description: This class inherits the functions from WinApp class that carries the basic application functions and handles the event interactions with Microsoft Windows and the user.
   memoryHandle, displayContent, multiDocument, tooBoxes, view, menu, Attributes: and popUpmenu initializeInstance( ), IoadWindowsResources( ), setPrinterl_andscape( ), Operations: setPrinterProtrait( ), getPrinterPaperSizeQ, setPrinterPaperSize( ), checkPrintStatus( ), loadResources( ), errorExceptionHandling( ), setCalendar( ), menuToolBar-l_ookup( )

2. NetPointDocument

Class Description: This class inherits the functions from CDocument class that contains the basic application functions and handles file open, close, and archive functions.

Attributes: paperSize, paperColor, predecessorList, successorsList

Operations: initializeInstance( ), IoadWindowsResources( ), setPrinterl_andscape( ), setPrinterProtraitQ, openFile( ), saveFile( ), getFileInfoQ, setCalendars( ), setColors( ), serialize( )

3. NetPointView

Class Description: This class inherits the functions from CScrollView class that provides the display content for graphical display on the screen. It contains vertical and horizontal scroll bars, which allow users to view a small segment of the plan at a time because the plan can be larger than what the screen could display. This class also supports the direct draw approach for users to enter data. Mouse device is used to create, draw, move, and modify objects using interactive graphics. This class also contains the definition of how timeline and calendar strips are drawn based on user's preferences.

Attributes: cursorX, cursorY, displayWidth, displayHeight, rightEdge, leftEdge, topEdge, bottomEdge, displayOptions Operations: scrollUp( ), scrollDownQ, scrollLeftQ, scrollRight( ), validateDisplayQ, onDrawQ, drawGrid( ), drawCalendarStrip( ), drawTitleBlock( ), drawLinks( ), drawLags( ), drawFloats( ), drawArrows( ), drawLinkH2V( ), drawLinkV2H( ), editCopyQ, editPasteQ, editDelete( ), editMove( ), editAlign( ), editPasteQ, select( ), selectWithinRectangle( ), deselect( ), remove( ), getDocument( ).

3.1 CalendarView

Class Description: Inheriting the functions from NetPointView class, this class defines the look and feel and the calendar strip. It controls the view of a calendar. Five levels of display options are available: year, quarter, month, week, and day. Users define calendar options and can set different color for the calendar strip.

Attributes: yearOption, quarterOption, monthOption, weekOption, dayOption, clendarColor, calendarStartDate, calendarEndDate Operations: setCalendarStripColor( ), setDlaplyOptions( ) setCalendarStartDate( ), setCalendarEndDateQ, calculateXfromCalendar( ), setOriginalXQ, updateCalendarQ.

3.2 HolidayView

Class Description: This class inherits the functions from NetPointView class. It controls the non-working day line that indicates holidays (both regular and user-defined). This non-working day line is drawn right below the calendar heading. A holiday will be displayed on the day line as a small circle with a letter "H" within it. This symbol indicates a break in duration calculation.

Attributes: holidaysCollection, startX, startY, endX, endY, color, and displayOptions Operations: findHolidays( ), updateDisplay( ), setHolidayTimel_ineColors( ), setTimeLineOn, setTimeLineOff, saveTimel_ineData( ), drawToNextHoliday( ), setl_ineColor( ), drawHsymbol( ), drawHellipseQ.

3.3 PrintView

Class Description: This class inherits the functions from NetPointView class. It controls the view when the user selects a print preview. The class renders the display and maps the graphical model into printer page size and orientation (landscape or portrait).

Attributes: zoomLevel, printerStatus, marginLeft, marginRight, marginTop, marginBottom Operations: setPrinterPortraint( ), setPeinterl_andscape( ), setPaperColor( ), setBackgroundCOior, setLeftMargin( ), setRightMargin( ), setTopMargin( ), setBottomBargin( ), cancelPrint( ), getPrinterStatus( ).

4. NetPointObj class

Class Description: This class inherits the functions from CObject class that defines the basic object functions and handles basic drawing capability such as drawing lines, points, circle, and polygons. Capability of drawing different color and brushes is defined in this class as well. All NetPoint™ graphical objects, including activity, milestone, infoObject, link, overlapNodes, and textbox, derive from this class.

Attributes: pen, color, brush, position, topLeftPoint, bottomRightPoint, textSize, textFontType, description, displayOptions, ESD (early start date), EFD (early start date), (late start date), LFD (late finish date), ASD (actual start date (AFD (actual finish date)

Operations: setPen( ), setColor, setBrushQ, setFont( ), setTextSize( ), getPosition( ), setDescriptionOn( ), setDescriptionOff, getESD( ), getEFD, getLSDQ, getLFDQ, getASDQ, getAFD( ), calcauteWorkingDays( ), calculateCalendarDays( ), findHolidays( ), findEaster( ), findMemorialDay( ), findIndependenceDay( ), findLaborDays( ), findThanksgiving( ), findXMas( ), findNewYear( ), 4.1 Activity Class Class Description: This class inherits the functions from NetPointObj class that defines the basic graphic functions. Activity class contains two subclasses, RegularActivity and DelayedActivity. RegularActv class defines any project tasks that consume resources and/or time; whereas, DelayedActv class defines delays such as winter shutdowns. Solid bars are used to graphically display a RegularActv and disconnected bars are used to display DelayedActv.

Attributes: endCircleRatio, barGapPixels, displayOptionsActv

Operations: drawRegularActvQ, drawDelayedActv( )

4.2 Milestone Class

Class Description: This class inherits the functions from NetPointObj class. Milestone contains two subclasses, Event class and Constraint class. The Event class sets the milestones of a project such as material delivery or project completion. The Constraint class defines the intermediate milestones that can be connected to activities to signify activity fixed deadline. Although the Event class and Constraint class both derive from the Milestone class, the graphical display is different. The Event milestone carries a vertical line that can span across several activities; whereas, the Constraint milestone set the date boundary for an individual activity.

Attributes: milestoneDate, tailLength (Event Milestone only)

Operations: drawEventMilestone( ), drawConstraintMilestone, drawSingleText( ), drawMultil_ineText( ), setColors( ), setTailLength( )

4.3 InfoObject Class

Class Description: This class inherits the functions from NetPointObj class. This class allows the user to attach a file (an image, an audio file, a video clip, a text file, a Microsoft Office file, a web link, or a PDF file) to the graphical icon. By double-clicking on an InfoObject, user can view the contents of the file.

Attributes: storedPath, storedFileName, storedFileExtension

Operations: drawInfoObject( ), onEditPropertiesInfoObjectQ, storePath( ), storeFileName( ), viewFileQ, openApplicationQ

4.4 Link Class

Class Description: This class also inherits the basic graphic functions from the NetPointObj class. It provides functions to draw links that connect other graphical objects such as activities and milestones. Two different link styles are V2H (vertical first, then horizontal), H2V (horizontal first, then vertical), HVH (horizontal, vertical, then horizontal) and VHV (vertical first, horizontal, then vertical).

Attributes: styleLabel

Operations: drawLineQ, drawCurve( ), drawArrows( ), calculateVerticalBend( ), calculateHotizontalBendQ, calculateNoOfArrowsQ

4.5 EmbeddedNode

Class Description: This EmbeddedNode class inherits the basic graphic functions from the NetPointObj class. Shaped as small circle, EmbeddedNodes can be placed on activities to represent overlapped relationships such as start-to-start (STS), finish-to-finish (FTF), and start-to-finish (STF) between two activities. The lead/lag times of these overlapped relationships are calculated from the relative location of the nodes on an activity bar. Links between activities on EmbeddedNodes represent that a predecessor and a successor's start or end dates are overlapped.

Attributes: overlapType

Operations: calculateLeadQ, calculateLagQ, testHitOrMissQ, integrateDraw( )

4.6 TextBox

Class Description: The TextBox class inherits the basic graphic functions from the NetPointObj class. This class provides the functions for users to enter text description at any location of the screen. Text can be single line or multiple lines.

Attributes: noTextLine

Operations: countTextl_ine( ), drawTextBox( ), calculateTextBoxSize( )

Although applicant has described applicant's preferred embodiments of this invention, it will be understood that the broadest scope of this invention includes modifications such as diverse shapes, sizes, and materials. Such scope is limited only by the below claims as read in connection with the above specification. Further, many other advantages of applicant's invention will be apparent to those skilled in the art from the above descriptions and the below claims.

The invention claimed is:

1. A computer program system relating to assisting at least one user relating to project planning and scheduling comprising the steps of:
   a) permitting selecting at least one time-scaled calendar on at least one graphical user interface;
   b) permitting identifying a plurality of activities relating to such at least one project having at least one initial estimated duration for each of such plurality of activities on such at least one graphical user interface;
   c) permitting positioning at least one symbol representing each of at least two activities of such plurality of activities on such at least one time-scaled calendar on such at least one graphical user interface;
   d) permitting designating at least one time-dependent relationship between such at least two activities;
   e) calculating at least one relationship float value relating to such at least one at least one time-dependent relationship;
   f) displaying, continuously such calculated at least one relationship float value on such at least one time-scaled calendar on such at least one graphical user interface; and
   g) storing at least one project plan, wherein such at least one project plan comprises at least
      i. at least two of such activities relating to at least one project,
      ii. such position of such at least one symbol representing such at least one activity on such selected at least on time-scaled calendar,
      iii. such at least one initial estimated duration relating to such at least one activity,
      iv. such at least one time-scaled calendar,
      v. such at least one time-dependent relationship between such at least two activities, and
      vi. such calculated at least one relationship float value.

2. The computer program system according to claim 1, wherein such at least one relationship float value ($H_{ij}$) calculation comprises $H_{ij}=H_j-H_i$, where "$H_j$" denotes the connection date to at least one successor activity "J" of a plurality of such successor activities and "$H_i$" denotes the connection date from at least one predecessor activity "I" of a plurality of such predecessor activities.

3. The computer program system according to claim 2, further comprising the steps of:
   a) calculating at least one buffer float value relating to such at least one time-dependent relationship
   b) wherein such calculation comprises $BF_i=\min[H_{ij}]$, for all "J", where "J" denotes each and every successor activity of a plurality of such successor activities to at least one "I" activity and "$H_{ij}$" denotes such at least one relationship float value relating to each and every such successor activity; and
   c) displaying, continuously such at least one buffer float value on such at least one time-scaled calendar on such at least one graphical user interface.

4. The computer program system according to claim 2, further comprising the steps of:
   a) calculating at least one activity float value relating to such at least one time-dependent relationship
      i. wherein such calculation comprises $AF_i=\min[H_{ij}+AF_j]$, for all "J", where "J" denotes each and every successor activity of a plurality of such successor activities to at least one "I" activity and "$H_{ij}$" denotes such at least one relationship float value relating to each and every such successor activity; and b) displaying, continuously such at least one activity float value on such at least one time-scaled calendar on such at least one graphical user interface.

5. The computer program system according to claim 4, further comprising the steps of:
   a) calculating at least one cut float value relating to such at least one time-dependent relationship
      i. wherein such calculation comprises $CF_i = \min[\min[H_{ij} + AF_j], H_{i,m}]$, where "$H_{i,m}$" denotes the such at least one relationship float value between such at least one "I" activity and a connected, one milestone deadline; and
   b) displaying, continuously such at least one cut float value on such at least one time-scaled calendar on such at least one graphical user interface.

6. The computer program system according to claim 5, further comprising the steps of:
   a) calculating at least one reverse float value relating to such at least one time-dependent relationship
      i. wherein such calculation comprises $RF_j = \min[RF_i + H_{ij}]$, for all "I", where "I" denotes each and every predecessor activity of a plurality of such predecessor activities to at least one "J" activity and "$H_{ij}$" denotes such at least one relationship float value relating to each and every such predecessor activity; and
   b) displaying, continuously, by such at least one computational device, such at least one reverse float value on such at least one time-scaled calendar on such at least one graphical user interface.

7. The computer program system according to claim 6, further comprising the steps of:
   a) permitting re-positioning such at least one symbol representing each of at least two activities of such plurality of activities on such at least one time-scaled calendar on such at least one graphical user interface;
   b) re-calculating such at least one relationship float value relating to such at least one at least one time-dependent relationship; and
   c) displaying, continuously, such re-calculated at least one relationship float value on such at least one time-scaled calendar on such at least one graphical user interface.

8. The computer program system according to claim 7, further comprising the step of permitting revising such at least one initial estimated duration relating to such at least one activity having such at least one time-dependent relationship on such at least one graphical user interface.

9. The computer program system according to claim 8, further comprising the steps of:
   a) re-calculating at least one buffer float value relating to such at least one at least one time-dependent relationship; and
   b) displaying, continuously, such re-calculated at least one buffer float value on such at least one time-scaled calendar on such at least one graphical user interface.

10. The computer program system according to claim 8, further comprising the steps of:
   a) re-calculating at least one activity float value relating to such at least one at least one time-dependent relationship; and
   b) displaying, continuously, such re-calculated at least one activity float value on such at least one time-scaled calendar on such at least one graphical user interface.

11. The computer program system according to claim 8, further comprising the steps of:
   a) re-calculating at least one cut float value relating to such at least one at least one time-dependent relationship; and
   b) displaying, continuously, such re-calculated at least one cut float value on such at least one time-scaled calendar on such at least one graphical user interface.

12. The computer program system according to claim 8, further comprising the steps of:
   a) re-calculating at least one reverse float value relating to such at least one at least one time-dependent relationship; and
   b) displaying, continuously, such re-calculated at least one reverse float value on such at least onetime-scaled calendar on such at least one graphical user interface.

13. The computer program system according to claim 1, wherein such at least one time-dependent relationship includes such relationship between any first activity embedded node, intermediate of the start and finish nodes of such at least one first activity, and any of the following:
   a) at least one activity start node of at least one second activity;
   b) at least one activity finish node of at least one second activity;
   c) at least one milestone deadline; and
   d) at least one second activity embedded node, intermediate of the start and finish nodes of such at least one second activity.

14. The computer program system according to claim 13, wherein such at least one time-dependent relationship comprises at least one first activity start node to such at least one second activity embedded node relationship.

15. The computer program system according to claim 13, wherein such at least one time-dependent relationship comprises at least one first activity embedded node to at least one second activity start node relationship.

16. The computer program system according to claim 13, wherein such at least one time-dependent relationship comprises at least one first activity finish node to at least one second activity embedded node relationship.

17. The computer program system according to claim 13, wherein such at least one time-dependent relationship comprises at least one first activity embedded node to at least one second activity finish node relationship.

18. The computer program system according to claim 13, wherein such at least one time-dependent relationship comprises at least one first activity embedded node to at least one milestone deadline relationship.

19. The computer program system according to claim 13, wherein such at least one time-dependent relationship comprises at least one first activity embedded node to at least one second activity embedded node relationship.

20. A computer program system, relating to assisting at least one user relating to project planning and scheduling, comprising:
   a) at least one first computer interface structured and arranged to permit selecting at least one time-scaled calendar on at least one graphical user interface;
   b) at least one second computer interface structured and arranged to permit identifying a plurality of activities relating to such at least one project having at least one initial estimated duration
for each of such plurality of activities on such at least one graphical user interface;
   c) at least one third computer interface structured and arranged to permit positioning of at least one symbol representing each of at least two activities of such plurality of activities on such at least one time-scaled calendar on such at least one graphical user interface;

d) at least one fourth computer interface structured and arranged to permit designating at least one time dependent relationship between such at least two activities;

e) at least one first computer processor structured and arranged to calculate at least one relationship float value relating to such at least one time-dependent relationship;

f) at least one fifth computer interface structured and arranged to display, continuously, such calculated at least one relationship float value on such at least one time-scaled calendar on such at least one graphical user interface; and g) at least one first computer data base structured and arranged to store at least one project plan wherein such at least one project plan comprises at least i. at least two of such activities relating to at least one project, ii. such position of such at least one symbol representing such at least one activity on such selected at least on time-scaled calendar, iii. such at least one initial estimated duration relating to such at least one activity, iv. such at least one time-scaled calendar, v. such at least one time-dependent relationship between such at least two activities, and vi. such calculated at least one relationship float value.

21. The computer program system according to claim 20, wherein such at least one relationship float value ($H_{ij}$) calculation comprises $H_{ij}=H_j-H_i$; where "$H_j$" denotes the connection date to at least one successor activity "J" of a plurality of such successor activities and "$H_i$" denotes the connection date from at least one predecessor activity "I" of a plurality of such predecessor activities.

22. The computer program system according to claim 20, further comprising:

a) at least one second computer processor structured and arranged to calculate at least one buffer float value relating to such at least one time-dependent relationship i. wherein such calculation comprises $BF_i=\min[H_{ij}]$, for all "J", where "J" denotes each and every successor activity of a plurality of such successor activities to at least one "I" activity and "$H_{ij}$" denotes such at least one relationship float value relating to each and every such successor activity; and b) at least one sixth computer interface structured and arranged to display, continuously such at least one buffer float value on such at least one time-scaled calendar on such at least one graphical user interface.

23. The computer program system according to claim 21, further comprising:

a) at least one second computer processor structured and arranged to calculate at least one activity float value relating to such at least one time-dependent relationship i. wherein such calculation comprises $AF_i=\min[H_{ij}+AF_j]$, for all "J", where "J" denotes each and every successor activity of a plurality of such successor activities to at least one "I" activity and "$H_{ij}$" denotes such at least one relationship float value relating to each and every such successor activity; and b) at least one seventh computer interface structured and arranged to display, continuously such at least one activity float value on such at least one time-scaled calendar on such at least one graphical user interface.

24. The computer program system according to claim 23, further comprising:

a) at least one fourth computer processor structured and arranged to calculate at least one cut float value relating to such at least one time-dependent relationship 1. wherein such calculation comprises $CF_i=\min[\min[H_{ij}+AF_j], H_{i,m}]$, where "$H_{i,m}$" denotes the such at least one relationship float value between such at least one "I" activity and a connected, later at least one milestone; and b) at least one eighth computer interface structured and arranged to display, continuously such at least one cut float value on such at least one time-scaled calendar on such at least one graphical user interface.

25. The computer program system according to claim 24, further comprising:

a) at least one fifth computer processor structured and arranged to calculate at least one reverse float value relating to such at least one time-dependent relationship i. wherein such calculation comprises $RF_j=\min[RF_i+H_{ij}]$, for all "I", where "I" denotes each and every predecessor activity of a plurality of such predecessor activities to at least one "J" activity and "$H_{ij}$" denotes such at least one relationship float value relating to each and every such predecessor activity; and b) at least one ninth computer interface structured and arranged to display, continuously, by such at least one computational device, such at least one reverse float value on such at least one time-scaled calendar on such at least one graphical user interface.

26. The computer program system according to claim 25, further comprising:

a) at least one tenth computer interface structured and arranged to permit re-positioning such at least one symbol representing each of at least two activities of such plurality of activities on such at least one time-scaled calendar on such at least one graphical user interface; and b) at least one sixth computer processor structured and arranged to re-calculate such at least one relationship float value relating to such at least one at least one time-dependent relationship; and c) at least one eleventh computer interface structured and arranged to display, continuously, such recalculated at least one relationship float value on such at least one time-scaled calendar on such at least one graphical user interface.

27. The computer program system according to claim 26, further comprising at least one twelfth computer interface structured and arranged to permit revising such at least one initial estimated duration relating to such at least one activity having such at least one time-dependent relationship on such at least one graphical user interface.

28. The computer program system according to claim 27, further comprising:

a) at least one seventh computer processor structured and arranged to re-calculate such at least one buffer float value relating to such at least one at least one time-dependent relationship; and b) at least one thirteenth computer interface structured and arranged to display, continuously, such recalculated at least one buffer float value on such at least one time-scaled calendar on such at least one graphical user interface.

29. The computer program system according to claim 27, further comprising:

a) at least one eighth computer processor structured and arranged to re-calculate such at least one activity float value relating to such at least one at least one time-dependent relationship; and b) at least one fourteenth computer interface structured and arranged to display, continuously, such recalculated at least one activity float value on such at least one time-scaled calendar on such at least one graphical user interface.

30. The computer program system according to claim 27, further comprising:
a) at least one ninth computer processor structured and arranged to re-calculate such at least one cut float value relating to such at least one at least one time-dependent relationship; and
b) at least one fifteenth computer interface structured and arranged to display, continuously, such recalculated at least one cut float value on such at least one time-scaled calendar on such at least one graphical user interface.

31. The computer program system according to claim 27, further comprising:
a) at least one tenth computer processor structured and arranged to re-calculate such at least one reverse float value relating to such at least one at least one time-dependent relationship; and
b) at least one sixteenth computer interface structured and arranged to display, continuously, such recalculated at least one reverse float value on such at least one time-scaled calendar on such at least one graphical user interface.

32. The computer program system according to claim 20, wherein such at least one time-dependent relationship includes such relationship between any first activity embedded node, intermediate of the start and finish nodes of such at least one first activity, and any of the following:
a) at least one activity start node of at least one second activity;
b) at least one activity finish node of at least one second activity;
c) at least one milestone deadline; and
d) at least one second activity embedded node, intermediate of the start and finish nodes of at least one second activity.

33. The computer program system according to claim 32, wherein such at least one time-dependent relationship comprises at least one first activity start node to such at least one second activity embedded node relationship.

34. The computer program system according to claim 32, wherein such at least one time-dependent relationship comprises at least one first activity embedded node to at least one second activity start node relationship.

35. The computer program system according to claim 32, wherein such at least one time-dependent relationship comprises at least one first activity finish node to at least one second activity embedded node relationship.

36. The computer program system according to claim 32, wherein such at least one time-dependent relationship comprises at least one first activity embedded node to at least one second activity finish node relationship 37. The computer program system according to claim 32, wherein such at least one time-dependent relationship comprises at least one first activity embedded node to at least one milestone deadline relationship.

38. The computer program system according to claim 32, wherein such at least one time-dependent relationship comprises at least one first activity embedded node to at least one second activity embedded node relationship.

* * * * *